United States Patent
Woo et al.

(10) Patent No.: US 11,639,435 B2
(45) Date of Patent: May 2, 2023

(54) METHOD FOR PREPARING HIGH-MELT-STRENGTH POLYPROPYLENE RESIN

(71) Applicant: LOTTE CHEMICAL CORPORATION, Seoul (KR)

(72) Inventors: Hyun Yul Woo, Daejeon (KR); Rai Ha Lee, Daejeon (KR); Su Jeong Jeong, Daejeon (KR); Joon Keun Min, Daejeon (KR); Eun Hye Shin, Daejeon (KR); Byung Hun Chae, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 244 days.

(21) Appl. No.: 16/762,842

(22) PCT Filed: Aug. 21, 2018

(86) PCT No.: PCT/KR2018/009582
§ 371 (c)(1),
(2) Date: May 8, 2020

(87) PCT Pub. No.: WO2019/093630
PCT Pub. Date: May 16, 2019

(65) Prior Publication Data
US 2021/0163725 A1    Jun. 3, 2021

(30) Foreign Application Priority Data

Nov. 9, 2017 (KR) .......................... 10-2017-0148613
Nov. 9, 2017 (KR) .......................... 10-2017-0148614

(51) Int. Cl.
*C08F 4/64* (2006.01)
*C08F 210/06* (2006.01)
*C08F 236/20* (2006.01)
*C08L 23/12* (2006.01)
*C08F 4/659* (2006.01)
*C08F 4/6592* (2006.01)
*C08L 23/26* (2006.01)

(52) U.S. Cl.
CPC .......... *C08L 23/12* (2013.01); *C08F 4/65908* (2013.01); *C08F 4/65912* (2013.01); *C08F 4/65927* (2013.01); *C08F 236/20* (2013.01); *C08L 23/26* (2013.01); *C08F 2420/00* (2013.01)

(58) Field of Classification Search
CPC .... C08F 210/06; C08F 236/20; C08F 236/02; C08F 4/64
See application file for complete search history.

(56) References Cited

U.S. PATENT DOCUMENTS

| | | | |
|---|---|---|---|
| 4,525,257 A | 6/1985 | Kurtz et al. | |
| 5,368,919 A | 11/1994 | Robeson | |
| 5,414,027 A | 5/1995 | DeNicola, Jr. et al. | |
| 5,416,169 A | 5/1995 | Saito et al. | |
| 5,541,236 A | 7/1996 | DeNicola, Jr. et al. | |
| 5,554,668 A | 9/1996 | Scheve et al. | |
| 5,591,785 A | 1/1997 | Scheve et al. | |
| 5,670,595 A | 9/1997 | Meka et al. | |
| 5,731,362 A | 3/1998 | Scheve et al. | |
| 7,531,605 B2 * | 5/2009 | Machida ................ | C08L 23/02 526/170 |
| 8,445,608 B2 | 5/2013 | Carpentier et al. | |
| 10,875,951 B2 * | 12/2020 | Chae ...................... | C08F 236/22 |
| 11,359,040 B2 * | 6/2022 | Chae ...................... | C08F 110/06 |
| 2014/0179884 A1 | 6/2014 | McCullough | |
| 2015/0119539 A1 | 4/2015 | McCullough | |

FOREIGN PATENT DOCUMENTS

| | | | | |
|---|---|---|---|---|
| KR | 1999-0044019 A | 6/1999 | | |
| KR | 2008-0066218 A | 7/2008 | | |
| KR | 2011-0084303 A | 7/2011 | | |
| KR | 10-2017-0114063 A | * 10/2017 | ............ | C08F 4/6592 |
| KR | 2017-0114063 A | 10/2017 | | |
| KR | 2017-0114064 A | 10/2017 | | |
| WO | 1997/049759 A1 | 12/1997 | | |
| WO | WO 2018/097468 A1 | * 5/2018 | ............ | C08F 210/16 |

OTHER PUBLICATIONS

KR 10-2017-0114063 A (Oct. 13, 2017); machine translation. (Year: 2017).*
International Search Report with Englisht translation issued in International Application No. PCT/KR2018/009582, dated Dec. 13, 2018 (5 pages).
Written Opinion issued in International Application No. PCT/KR2018/009582, dated Dec. 13, 2018 (5 pages).

* cited by examiner

*Primary Examiner* — Rip A Lee
(74) *Attorney, Agent, or Firm* — Osha Bergman Watanabe & Burton LLP

(57) ABSTRACT

Disclosed is a method using a metallocene catalyst system so as to control the polymer structure of a diene-modified polypropylene through process simplification, thereby being capable of preparing a hyperbranched polypropylene resin having a low gel content and improved melt strength. The present invention provides a method using a catalyst so as to polymerize propylene and a diene compound, thereby preparing a diene-modified polypropylene resin having a branching index of 0.95 or less, a gel content of 3 wt % or less and an advanced rheometric expansion system (ARES) melt strength of 5 g or more.

9 Claims, 1 Drawing Sheet

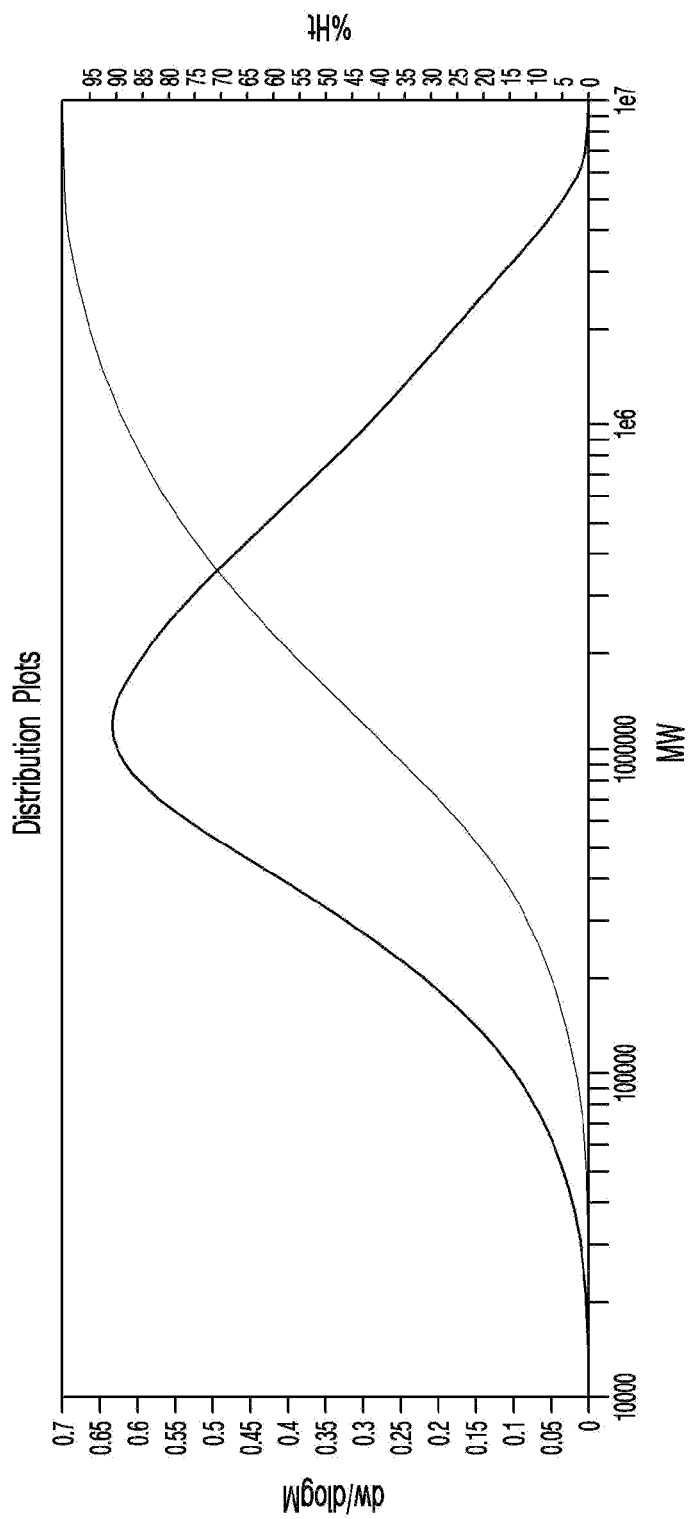

METHOD FOR PREPARING HIGH-MELT-STRENGTH POLYPROPYLENE RESIN

TECHNICAL FIELD

The present invention relates to a method for preparing a high-melt-strength polypropylene resin, and more particularly, to a method for preparing a polypropylene resin which exhibits a low gel content and high-melt strength, using a metallocene catalyst.

BACKGROUND ART

Polypropylene and related polymers are known to have low-melt strength. However, this physical property has been pointed out as a weak point in the field of major applications such as thermoforming and blow molding. The limitation in the melt strength of polypropylene appears as excessive settling in sheet extrusion, high-speed thinning of the walls of parts thermoformed in the melt phase, low draw-down ratio in extruded covering, poor bubble formation in extruded foam materials, and relative vulnerability in blow molding of large parts. Therefore, polypropylene and related polymers having improved melt strength as well as commercially valuable processability are constantly demanded commercially.

Studies to increase the melt strength of polymers such as polypropylene have been conducted over the last few decades, but their success has been limited. A representative method includes a method of copolymerizing propylene with α-ω-diene to introduce an unsaturated group into the polymer using a conventional Ziegler-Natta type catalyst. However, the processing method generally uses a post-process of polymerized polypropylene to obtain similar products through peroxide decomposition, and thus, the manufacturing cost through the post-process is high and the peroxide decomposition process may be harmful to workers and cause problems such as changes in physical properties of the resins due to the residual amount of unreacted monomers. In addition, there was a problem, for example, occurring gelation of the resin itself due to the excessively injected diene. Therefore, the study of propylene polymers having improved melt strength and good processability has been steadily required.

An olefin polymerization catalyst system can be classified into Ziegler-Natta and metallocene catalyst systems, and these two high-activity catalyst systems have been developed for each characteristic. The Ziegler-Natta catalyst has been widely applied to existing commercial processes since its invention in the 1950s. However, the Ziegler-Natta catalyst is a multi-site catalyst in which a plurality of active species are mixed, and thus has the characteristic of broad molecular weight distribution of polymers. To this end, the Ziegler-Natta catalyst has a problem in that it is limited to obtain the desired physical properties due to non-homogeneous compositional distribution of co-monomers. However, the metallocene catalyst is composed of a combination of a main catalyst, of which the main component is a transition metal compound, and a cocatalyst, which is an organometallic compound mainly composed of aluminum. The metallocene catalyst is a homogeneous system complex catalyst and a single site catalyst and thus, has characteristics that a polymer having narrow molecular weight distribution and a homogeneous compositional distribution of co-monomers can be obtained according to the single active site characteristic and the stereoregularity, copolymer characteristics, molecular weight, degree of crystallinity and the like of the polymer may be changed depending on the modification of ligand structure of the catalyst and changes in polymerization conditions.

Polypropylene (PP) has a high melting point and a low density. In addition, excellent chemical resistance and high tensile modulus can be obtained at low cost. For this reason, the polypropylene has an overwhelming market share in plastic products. However, the polypropylene shows the poor process characteristics in the process where tension stiffness is mainly required. In order for polypropylene to be used in a shaping process such as foaming, thermoforming, extrusion coating, and blow molding, the deformation hardening phenomenon of the melt (expression of high melt strength) is essential, and the modification of the polypropylene is essential to improve the phenomenon.

Thus, studies to increase the melt strength of polymers such as polypropylene have been conducted over the last few decades, but their success has been limited. A representative method includes a method of copolymerizing propylene with α-ω-diene to introduce an unsaturated group into the polymer using a conventional Ziegler-Natta type catalyst. However, the processing method generally uses a post-process of polymerized polypropylene to obtain similar products through peroxide decomposition, and thus, the manufacturing cost through the post-process is expensive and the peroxide decomposition process may be harmful to workers and problems such as changes in physical properties of the resins due to the residual amount of unreacted monomers may be caused. In addition, there was a problem, for example, occurring gelation of the resin itself due to the excessively injected diene. In another method, broad (including bimodal) molecular weight distribution (MWD) can be a method capable of improving melt strength, but a method for efficiently improving melt strength by adding a long chain branch (LCB) to a polypropylene main chain is more effective.

Korean Patent Laid-Open Publication No. 2011-0084303 discloses a method for preparing a long chain branched isotactic polypropylene after the preparation of an oligomer polypropylene and a method for using two catalysts of an oligomer catalyst and a cross-linking catalyst, but there is a problem in that a two-step reaction is performed, thereby being uneconomical in terms of facility and production costs.

U.S. Pat. Nos. 5,368,919, 5,414,027, 5,541,236, 5,554,668, 5,591,785 and 5,731,362 disclose a polypropylene polymer having high-melt strength. The performance of the polypropylene polymer according to these patents is excellent, but there is a problem in that the installation and operation of the electron beam irradiation equipment is expensive and productivity is low, and thus the production cost of polypropylene having high-melt strength is high.

U.S. Pat. Nos. 5,416,169, 4,525,257, and International Patent Publication WO 1997/049759 disclose a method for introducing a long chain to polypropylene by reacting an organic peroxide with polypropylene in a specific reaction condition, but there is a problem in that the reaction conditions are varied for each step in proportion to the half-life temperature of the peroxide so that the production time is long and productivity is low, or a reactive extrusion process should be carried out, and polypropylene is decomposed due to peroxide.

Each of Korean Patent Laid-Open Publication Nos. 2017-0114064 and 2017-0114063 discloses a method for preparing a diene modified polypropylene resin having improved melt strength by directly contacting propylene and diene compounds using a metallocene catalyst system. However, these patents have a problem in that when the diene content is increased in order to improve melt strength, the gel content also increases, and thus there is a limitation on the industrial application, as well as a limitation in increasing melt strength appears when the diene content is out of a certain level.

DISCLOSURE OF THE INVENTION

Technical Problem

The present invention has been made to solve the above-mentioned problems, and it is an object of the present invention to provide a method using a metallocene catalyst system so as to control the polymer structure of a diene-modified polypropylene through process simplification, thereby being capable of preparing a hyperbranched polypropylene resin having a low gel content and improved melt strength.

TECHNICAL SOLUTION

To solve the above problem, the present invention provides a method for preparing a diene-modified polypropylene resin having a branching index of 0.95 or less, a gel content of 3 wt % or less and an advanced rheometric expansion system (ARES) melt strength of 5 g or more by polymerizing propylene and a diene compound using a catalyst containing a transition metal compound represented by Formula 1 below:

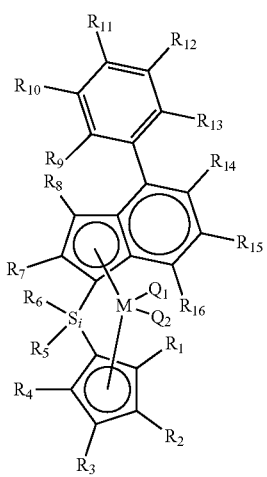

[Formula 1]

in Formula 1,

M is a Group 4 transition metal;

Q1 and Q2 are each independently halogen, $(C_1-C_{20})$ alkyl, $(C_2-C_{20})$alkenyl, $(C_2-C_{20})$alkynyl, $(C_6-C_{20})$aryl, $(C_1-C_{20})$alkyl $(C_6-C_{20})$aryl, $(C_6-C_{20})$aryl $(C_1-C_{20})$alkyl, $(C_1-C_{20})$alkylamido or $(C_6-C_{20})$arylamido, or represented by Formula 5 below, and in Formula 5 below, R17 and R18 are each independently hydrogen, $(C_1-C_{20})$alkyl, $(C_2-C_{20})$alkenyl, $(C_2-C_{20})$alkynyl, $(C_6-C_{20})$aryl, $(C_1-C_{20})$alkyl $(C_6-C_{20})$aryl, $(C_6-C_{20})$aryl $(C_1-C_{20})$alkyl, $(C_1-C_{20})$alkylamido or $(C_6-C_{20})$arylamido, and n is an integer of 1 or 2;

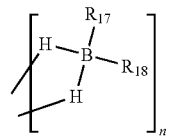

[Formula 5]

$R_1$, $R_2$, $R_3$ and $R_4$ are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl $(C_6-C_{20})$aryl including or not including acetal, ketal or an ether group; $(C_6-C_{20})$aryl $(C_1-C_{20})$alkyl including or not including acetal, ketal or an ether group; or $(C_1-C_{20})$silyl including or not including acetal, ketal or an ether group; and two or more among $R_1$, $R_2$, $R_3$, and $R_4$ are able to be connected with each other to form an aliphatic ring or an aromatic ring;

$R_5$, $R_6$, $R_7$ and $R_8$ are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl $(C_6-C_{20})$aryl including or not including acetal, ketal or an ether group; and $R_9$, $R_{10}$, $R_{11}$, $R_{12}$, $R_{13}$, $R_{14}$, $R_{15}$, and $R_{16}$ are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl $(C_6-C_{20})$aryl including or not including acetal, ketal or an ether group; $(C_6-C_{20})$aryl $(C_1-C_{20})$alkyl including or not including acetal, ketal or an ether group; or $(C_1-C_{20})$silyl including or not including acetal, ketal or an ether group; and two or more among $R_9$, $R_{10}$, $R_{11}$, $R_{12}$, $R_{13}$, $R_{14}$, $R_{15}$, and $R_{16}$ are able to be connected with each other to form an aliphatic ring or an aromatic ring.

In addition, there is provided a method characterized in that at least one among $R_1$, $R_2$, $R_3$ and $R_4$ above may be hydrogen, at least one may be $(C_4-C_{20})$alkyl, and the others may be each independently $(C_1-C_{20})$alkyl, $(C_2-C_{20})$alkenyl, $(C_6-C_{20})$aryl, or $(C_1-C_{20})$ silyl including or not including acetal, ketal or an ether group; or at least two among $R_1$, $R_2$, $R_3$ and $R_4$ above may be able to be connected with each other to form an aliphatic ring or an aromatic ring.

Furthermore, there is provided a method characterized in that at least one among $R_1$, $R_2$, $R_3$ and $R_4$ above may be hydrogen, and the others may be each independently $(C_1-C_{20})$alkyl.

Additionally, there is provided a method characterized in that at least two among $R_1$, $R_2$, $R_3$ and $R_4$ above may be hydrogen, and the others may be each independently $(C_1-C_{20})$alkyl.

Moreover, there is provided a method characterized in that the catalyst may be a catalyst in which a transition metal compound of Formula 1 above; and at least one cocatalyst compound selected from the group consisting of the compounds represented by Formulae 2 to 4 below are supported:

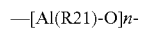   [Formula 2]

in Formula 2, R21's may be the same as or different from each other, and each independently a halogen radical, a halogen-substituted or unsubstituted $C_1-C_{20}$ hydrocarbyl radical; and n may be an integer of 2 or more,

   [Formula 3]

in Formula 3, A may be aluminum or boron; and R22's may be the same as or different from each other, and each independently a halogen radical, or a halogen-substituted or unsubstituted $C_1$-$C_{20}$ hydrocarbyl radical, $$[L-H]^+[Z(B)_4]^- \text{ or } [L]^+[Z(B)_4]^- \quad \text{[Formula 4]}$$

in Formula 4, L may be a neutral or cationic Lewis acid; H may be a hydrogen atom; and Z may be a Group 13 element; and B's may be each independently a $C_6$-$C_{20}$ aryl or alkyl radical having at least one hydrogen atom substituted with a halogen radical, a $C_1$-$C_{20}$ hydrocarbyl radical, a $C_1$-$C_{20}$ alkoxy radical, or a $C_1$-$C_{20}$ phenoxy radical.

In addition, there is provided a method characterized in that the diene compound may be at least one selected from among an aliphatic diene compound and aromatic diene compound having 4 to 20 carbon atoms.

Furthermore, there is provided a method characterized in that the diene compound may be at least one selected from the group consisting of 1,5-hexadiene, 1,6-heptadiene, 1,7-octadiene, 1,8-nonadiene, 1,9-decadiene, 1,10-undecadiene, 1,11-dodecadiene, 1,12-tridecadiene and 1,13-tetradecadiene.

Additionally, there is provided a method characterized in that the polymerization reaction may be performed by adding 0.008-0.25 mole of the diene with respect to 500 g of the propylene.

In addition, there is provided a method characterized in that the polypropylene resin may be a non-unimodal polypropylene resin having a molecular weight distribution of 3.0 or more.

Moreover, there is provided a method characterized in that the polypropylene resin may have a melting peak of 160° C. or less.

Advantageous Effects

A method for preparing a polypropylene resin according to the present invention is carried out by directly contacting propylene and diene compounds using a metallocene catalyst, thereby having an economical effect in facility and production costs compared to the conventional method for producing a high-melt-strength polypropylene resin such as a two-step reaction or a reactive extrusion process.

In addition, the method is capable of controlling a long chain branch structure such as a branching degree and a molecular weight of chains in polypropylene compared to the conventional reaction using peroxide, thereby providing a polypropylene resin having excellent physical properties.

Furthermore, the method can provide a polypropylene resin having a very low gel content by using a specific structure metallocene catalyst despite the increase of an advanced rheometric expansion system (ARES) melt strength.

BRIEF DESCRIPTION OF THE FIGURES

The Figure is a view illustrating a molecular weight distribution curve (non-unimodal) of a polypropylene resin prepared according to a method of the present invention.

MODE FOR CARRYING OUT THE INVENTION

Hereinafter, preferred embodiments of the present invention will be described in detail. In describing the present invention, if a detailed description relating to well-known technology is considered to obscure the subject matter of the present invention, the detailed description may be omitted. Throughout the specification, a part is referred to "include" an element, the part does not exclude other elements but may further include other elements unless otherwise indicated.

The present invention discloses a method for preparing a diene-modified polypropylene resin having a branching index of 0.95 or less, a gel content of 3 wt % or less and an advanced rheometric expansion system (ARES) melt strength of 5 g or more by polymerizing propylene and a diene compound using a catalyst containing a transition metal compound represented by Formula 1 below:

[Formula 1]

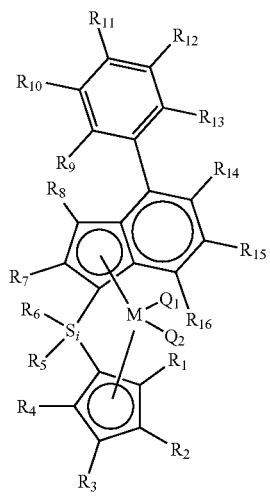

wherein, in Formula 1,

M is a Group 4 transition metal;

Q1 and Q2 are each independently halogen, $(C_1$-$C_{20})$alkyl, $(C_2$-$C_{20})$alkenyl, $(C_2$-$C_{20})$alkynyl, $(C_6$-$C_{20})$aryl, $(C_1$-$C_{20})$alkyl $(C_6$-$C_{20})$aryl, $(C_6$-$C_{20})$aryl $(C_1$-$C_{20})$alkyl, $(C_1$-$C_{20})$alkylamido or $(C_6$-$C_{20})$arylamido, or represented by Formula 5 below, and in Formula 5 below, $R_{17}$ and $R_{18}$ are each independently hydrogen, $(C_1$-$C_{20})$alkyl, $(C_2$-$C_{20})$alkenyl, $(C_2$-$C_{20})$alkynyl, $(C_6$-$C_{20})$aryl, $(C_1$-$C_{20})$alkyl $(C_6$-$C_{20})$aryl, $(C_6$-$C_{20})$aryl $(C_1$-$C_{20})$alkyl, $(C_1$-$C_{20})$alkylamido or $(C_6$-$C_{20})$arylamido, and n is an integer of 1 or 2;

[Formula 5]

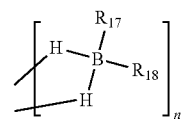

$R_1$, $R_2$, $R_3$ and $R_4$ are each independently hydrogen; $(C_1$-$C_{20})$alkyl including or not including acetal, ketal or an ether group; $(C_2$-$C_{20})$alkenyl including or not including acetal, ketal or an ether group; $(C_1$-$C_{20})$alkyl $(C_6$-$C_{20})$aryl including or not including acetal, ketal or an ether group; $(C_6$-$C_{20})$aryl $(C_1$-$C_{20})$alkyl including or not including acetal, ketal or an ether group; or $(C_1$-$C_{20})$silyl including or not including acetal, ketal or an ether group; and two or more among $R_1$, $R_2$, $R_3$, and $R_4$ are able to be connected with each other to form an aliphatic ring or an aromatic ring;

$R_5$, $R_6$, $R_7$ and $R_8$ are each independently hydrogen; $(C_1$-$C_{20})$alkyl including or not including acetal, ketal or an ether group; $(C_2$-$C_{20})$alkenyl including or not including acetal, ketal or an ether group; $(C_1$-$C_{20})$alkyl $(C_6$-$C_{20})$aryl including or not including acetal, ketal or an ether group; and $R_9$, $R_{10}$, $R_{11}$, $R_{12}$, $R_{13}$, $R_{14}$, $R_{15}$, and $R_{16}$ are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl $(C_6-C_{20})$aryl including or not including acetal, ketal or an ether group; $(C_6-C_{20})$aryl $(C_1-C_{20})$alkyl including or not including acetal, ketal or an ether group; or $(C_1-C_{20})$silyl including or not including acetal, ketal or an ether group; and two or more among $R_9$, $R_{10}$, $R_{11}$, $R_{12}$, $R_{13}$, $R_{14}$, $R_{15}$, and $R_{16}$ are able to be connected with each other to form an aliphatic ring or an aromatic ring.

Meanwhile, when $Q_1$ and $Q_2$ above are represented by Formula 5 above, the transition metal compound has a structure of Formula 6 below, and when n is 2 in Formula 5 above, the transition metal compound has a structure of Formula 7 below.

[Formula 6]

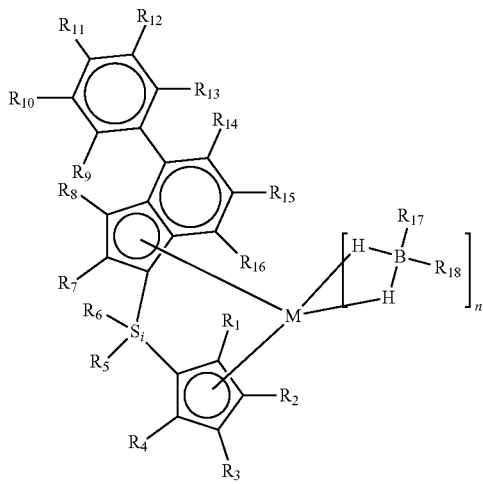

[Formula 7]

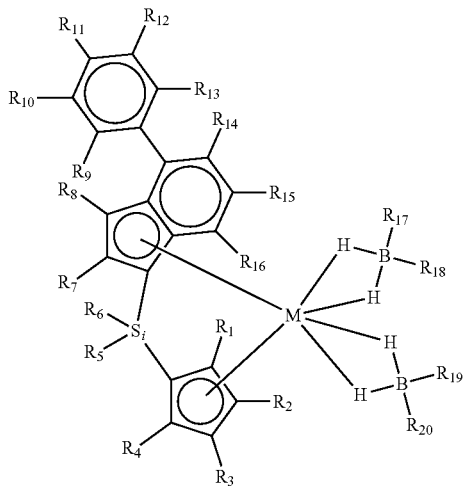

In Formula 7 above, $R_{19}$ and $R_{20}$ are each independently hydrogen, $(C_1-C_{20})$alkyl, $(C_2-C_{20})$alkenyl, $(C_2-C_{20})$alkynyl, $(C_6-C_{20})$aryl, $(C_1-C_{20})$alkyl $(C_6-C_{20})$aryl, $(C_6-C_{20})$aryl $(C_1-C_{20})$alkyl, $(C_1-C_{20})$alkylamido, or $(C_6-C_{20})$arylamido.

In addition, the present invention provides a method characterized in that at least one among $R_1$, $R_2$, $R_3$ and $R_4$ above may be hydrogen, at least one may be $(C_4-C_{20})$alkyl, and the others may be each independently $(C_1-C_{20})$alkyl, $(C_2-C_{20})$alkenyl, $(C_6-C_{20})$aryl, or $(C_1-C_{20})$ silyl including or not including acetal, ketal or an ether group; or at least two among $R_1$, $R_2$, $R_3$ and $R_4$ above may be able to be connected with each other to form an aliphatic ring or an aromatic ring.

Furthermore, the present invention provides a method characterized in that at least one among $R_1$, $R_2$, $R_3$ and $R_4$ above may be hydrogen, and the others may be each independently $(C_1-C_{20})$alkyl.

In addition, the present invention provides a method characterized in that at least two among $R_1$, $R_2$, $R_3$ and $R_4$ above may be hydrogen, the others may be each independently $(C_4-C_{20})$alkyl, and the others may be each independently $(C_1-C_{20})$alkyl, $(C_2-C_{20})$alkenyl, $(C_6-C_{20})$aryl, or $(C_1-C_{20})$ silyl including or not including acetal, ketal or an ether group; or at least two among $R_1$, $R_2$, $R_3$ and $R_4$ above may be able to be connected with each other to form an aliphatic ring or an aromatic ring.

Additionally, the present invention provides a method characterized in that at least two among $R_1$, $R_2$, $R_3$ and $R_4$ above may be hydrogen, and the others may be each independently $(C_1-C_{20})$alkyl.

The term "alkyl" described in the present invention means a linear or branched-chain saturated monovalent hydrocarbon radical composed of only carbon and hydrogen atoms, and examples of such an alkyl radical include methyl, ethyl, propyl, isopropyl, butyl, isobutyl, t-butyl, pentyl, hexyl, octyl, dodecyl, etc., but are not limited thereto.

In addition, the term "cycloalkyl" described in the present invention means a monovalent aliphatic alkyl radical composed of one ring, and examples of the cycloalkyl include cyclopropyl, cyclobutyl, cyclopentyl, cyclohexyl, cycloheptyl, cyclooctyl, cyclononyl, cyclodecyl, etc., but are not limited thereto.

In addition, the term "alkenyl" described in the present invention means a linear or branched chain hydrocarbon radical including one or more carbon-carbon double bonds, and includes ethenyl, propenyl, butenyl, pentenyl, etc., but is not limited thereto.

Furthermore, the term "aryl" described in the present invention is an organic radical derived from an aromatic hydrocarbon by the removal of one hydrogen atom and includes a single or fused ring system. Particular examples include phenyl, naphthyl, biphenyl, anthryl, fluorenyl, phenanthryl, triphenylenyl, pyrenyl, perylenyl, chrysenyl, naphthacenyl, fluoranthenyl, etc., but are not limited thereto.

In addition, the term "alkoxy" described in the present invention means a —O-alkyl radical, where "alkyl" is the same as defined above. Examples of such an alkoxy radical include methoxy, ethoxy, isopropoxy, butoxy, isobutoxy, t-butoxy, etc., but are not limited thereto.

Further, the term "halogen" described in the present invention means a fluorine, chlorine, bromine or iodine atom.

In the present invention, the transition metal compound has an ansa-metallocene structure including cyclopentadiene derivative ligands which are connected with each other via a silicon or alkenylene bridge group, and an indenyl derivative ligand in which aryl is surely substituted at position 4, as represented by Formula 1.

As described above, the transition metal compound has an indene derivative ligand in which aryl is substituted at position 4, and thus has excellent catalyst activity and copolymerization degree when compared with a transition metal compound having a ligand in which an aryl group is unsubstituted at position 4 of indene.

Here, with respect to the transition metal compound according to the present invention, when at least one among $R_1$, $R_2$, $R_3$ and $R_4$ in the structure of Formula 1, preferably at least two are hydrogen, and the others are each independently substituted with ($C_1$-$C_{20}$)alkyl, ($C_1$-$C_{20}$)alkenyl, ($C_1$-$C_{20}$)aryl or ($C_1$-$C_{20}$)silyl including or not including acetal, ketal or an ether group, and it is preferred that at least two among $R_1$, $R_2$, $R_3$ and $R_4$ are able to be connected to each other to form an aliphatic ring or an aromatic ring, most preferably, at least two among $R_1$, $R_2$, $R_3$ and $R_4$ are hydrogen, and the others are each independently substituted with ($C_1$-$C_{20}$)alkyl, it is possible to control the diene content, branch structure density, molecular weight, etc., thereby improving an ARES melt strength and suppressing gel formation, so that the required physical properties can be sufficiently satisfied. In particular, it is possible to produce a polyolefin having excellent activity and a high molecular weight during olefin polymerization using propylene or ethylene as a monomer.

Meanwhile, in order for the transition metal compound of Formula 1 above to become an active catalyst component used in an olefin polymerization, compounds represented by Formulae 2 to 4 below, which may extract a ligand from the transition metal compound to cationize the central metal so as to act as a counterion, i.e., anion having a weak bonding force, may be applied together as cocatalysts.

$$—[Al(R21)\text{-}O]n\text{-} \qquad [\text{Formula 2}]$$

in Formula 2, R21's are the same as or different from each other, and each independently a halogen radical, a halogen-substituted or unsubstituted $C_1$-$C_{20}$ hydrocarbyl radical; and n is an integer of 2 or more.

$$A(R22)_3 \qquad [\text{Formula 3}]$$

in Formula 3, A is aluminum or boron; and R22's are the same as or different from each other, and each independently a halogen radical, or a halogen-substituted or unsubstituted $C_1$-$C_{20}$ hydrocarbyl radical.

$$[L\text{-}H]^+[Z(B)_4]^- \text{ or } [L]^+[Z(B)_4]^- \qquad [\text{Formula 4}]$$

in Formula 4, L is a neutral or cationic Lewis acid; H is a hydrogen atom; and

Z is a Group 13 element; and B's are each independently a $C_6$-$C_{20}$ aryl or alkyl radical having at least one hydrogen atom substituted with a halogen radical, a $C_1$-$C_{20}$ hydrocarbyl radical, a $C_1$-$C_{20}$ alkoxy radical, or a $C_1$-$C_{20}$ phenoxy radical.

The compound represented by Formula 2 above is not specifically limited as long as it is an alkylaluminoxane, but preferred examples include methylaluminoxane, ethylaluminoxane, isobutylaluminoxane, butylaluminoxane, etc., and particularly preferable compound is methylaluminoxane, so that the cocatalyst compound shows excellent activation effect.

The alkyl metal compound represented by Formula 3 above is not specifically limited, but preferred examples include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc., and particularly preferred compounds may be selected from among trimethylaluminum, triethylaluminum and triisobutylaluminum.

In addition, in the cocatalyst compound represented by Formula 4 above, it is preferred that $[L\text{-}H]^+$ above is a dimethylanilinium cation and $[Z(A)_4]^-$ above is $[B(C_6F_5)_4]^-$, and it is preferred that $[L]^+$ above is $[(C_6H_5)_3C]^+$ and $[Z(A)_4]^-$ above is $[B(C_6F_5)_4]^-$. Here, the cocatalyst compound represented by Formula 4 above is not specifically limited but non-limiting examples include triethylammoniumtetraphenylborate, tributylammoniumtetraphenylborate, trimethylammoniumtetraphenylborate, tripropylammoniumtetraphenylborate, trimethylammoniumtetra(p-tolyl)borate, tripropylammoniumtetra(p-tolyl)borate, trimethylammoniumtetra(o,p-dimethylphenyl)borate, triethylammoniumtetra(o,p-dimethylphenyl)borate, tributylammoniumtetra(p-trifluoromethylphenyl)borate, trimethylammoniumtetra(p-trifluoromethylphenyl)borate, tributylammoniumtetrapentafluorophenylborate, N,N-diethylamylidiumtetraphenylborate, N,N-diethylaniliniumtetraphenylborate, N,N-diethylaniliniumtetrapentafluorophenylborate, diethylammoniumtetrapentafluorophenylborate, triphenylphosphoniumtetraphenylborate, trimethylphosphoniumtetraphenylborate, triphenylcarboniumtetra(p-trifluoromethylphenyl)borate, triphenylcarboniumtetrapentafluorophenylborate, dimethylaniliniumtetrakis(pentafluorophenyl)borate, etc.

A catalyst composition may be prepared using the compounds of Formula 1 to Formula 4 above and then used for preparing a diene-modified polypropylene, and the following illustrated methods may be used as a method for preparing a catalyst composition.

Firstly, when $Q_1$ and $Q_2$ of the transition metal compound represented by Formula 1 above are halogen, a method in which compounds represented by Formula 2 above are contacted with the transition metal compound is used. Secondly, a catalyst composition is prepared by contacting the compounds represented by Formulae 3 and 4 above and the transition metal compound when $Q_1$ and $Q_2$ of Formula 1 above are alkyl radical, or a catalyst composition is prepared by separating and injecting the transition metal compound to the polymerization reactor.

The added amount of the cocatalyst compound may be determined by considering the added amount of the transition metal compound represented by Formula 1 above, an amount required for sufficiently activating the cocatalyst compound, etc. The content of the cocatalyst compound may be 1:1-100,000, preferably, 1:1-10,000, more preferably, 1:1-5,000 based on the molar ratio of a metal contained in the cocatalyst compound with respect to 1 mol of a transition metal contained in the transition metal compound represented by Formula 1 above.

More specifically, in the case of the first method, the compound represented by Formula 2 above may be included in a molar ratio of 1:10-5,000, more preferably, in a molar ratio of 1:50-1,000, most preferably, in a molar ratio of 1:100-1,000 with respect to the transition metal compound represented by Formula 1 above. If the molar ratio of the compound represented by Formula 2 above with respect to the transition metal compound of Formula 1 above is less than 1:10, the amount of aluminoxane is very small, and thus the activation of a metal compound may incompletely carried out, and if the molar ratio is greater than 1:5,000, an excessive amount of aluminoxane acts as a catalyst poison, and thus the aluminoxane may inhibit a polymer chain from growing well.

In addition, in the case of the second method, when A in the cocatalyst composition represented by Formula 3 above is boron, the compound represented by Formula 3 above may be supported in a molar ratio of 1:1-100, preferably, 1:1-10, more preferably, 1:1-3 with respect to the transition metal compound represented by Formula 1 above. Also, when A in the cocatalyst compound represented by Formula 3 above is aluminum, the compound represented by Formula 3 above may be supported in a molar ratio of 1:1-1000, preferably, 1:1-500, more preferably, 1:1-100 with respect to the transition metal compound represented by Formula 1 above, even though the molar ratio may be changed according to the amount of water in a polymerization system.

In addition, the cocatalyst compound represented by Formula 4 above may be supported in a molar ratio of 1:0.5-30, preferably, 1:0.7-20, more preferably, 1:1-10 with respect to the transition metal compound represented by Formula 1 above. If the ratio of the cocatalyst compound represented by Formula 4 above is less than 1:0.5, the amount of an activating agent is relatively small, and the activation of a metal compound may be incompletely carried out, and thus, the activity of a produced catalyst composition may be degraded. If the ratio is greater than 1:30, the activation of a metal compound may be completely carried out, but due to the remaining excessive amount of activating agent, the unit cost of the catalyst composition may be economically infeasible or the purity of a produced polymer may be degraded.

Meanwhile, the catalyst according to the present invention may further include a support in the compound represented by Formula 1 above and the cocatalyst compound.

As the support, any supports of an inorganic or organic material used for the preparation of a catalyst in the art of the present invention may be used without limitation, for example, $SiO_2$, $Al_2O_3$, MgO, $MgCl_2$, $CaCl_2$, $ZrO_2$, $TiO_2$, $B_2O_3$, CaO, ZnO, BaO, $ThO_2$, $SiO_2^-$ $Al_2O_3$, $SiO_2$—MgO, $SiO_2^-$ $TiO_2$, $SiO_2^-$ $V_2O_5$, $SiO_2^-$ $CrO_2O_3$, $SiO_2$—$TiO_2$—MgO, bauxite, zeolite, starch, cyclodextrine, a synthetic polymer, etc. Preferably, the support may include a hydroxyl group at the surface thereof, and may be one or more supports selected from the group consisting of silica, silica-alumina and silica-magnesia.

As a method for supporting the transition metal compound and the cocatalyst compound in the support, a method of directly supporting the transition metal compound in a dehydrated support, a method of supporting the transition metal compound after pre-treating the support with the cocatalyst compound, a method of supporting the transition metal compound in the support followed by post-treating with the cocatalyst compound, a method of reacting the transition metal compound with the cocatalyst compound, followed by adding a support to carry out the reaction, etc. may be used.

A solvent which can be used in the supporting methods may be an aromatic hydrocarbon-based solvent, an aromatic hydrocarbon-based solvent, a halogenated aliphatic hydrocarbon-based solvent, or a mixture thereof. Here, non-limiting examples of the aliphatic hydrocarbon-based solvent may include pentane, hexane, heptane, octane, nonane, decane, undecane, dodecane, etc. In addition, non-limiting examples of the aromatic hydrocarbon-based solvent may include benzene, monochlorobenzene, dichlorobenzene, trichlorobenzene, toluene, etc. In addition, non-limiting examples of the halogenated aliphatic hydrocarbon-based solvent may include dichloromethane, trichloromethane, dichloroethane, trichloroethane, etc.

In addition, a process for supporting the transition metal compound and the cocatalyst compound on a support may be advantageously carried out at a temperature of −70° C. to 200° C., preferably, −50° C. to 150° C., more preferably, 0° C. to 100° C. considering the efficiency of a supporting process.

According to an embodiment of the present invention, a copolymer, which is produced through a polymerization process performed by directly contacting diene and propylene compounds, may be prepared by polymerizing diene and propylene under the condition in which a polymer chain is rapidly fixed according to the information since a catalytic site is relatively insoluble and/or fixable. Such fixation may be performed by, for example, using a solid insoluble catalyst, generally performing copolymerization in a medium insoluble for the resulting copolymer, and keeping a polymerization reactant and product to less than or equal to the crystal melting point of a copolymer.

The method for preparing a diene-modified polypropylene according to the present invention is performed by including a step of copolymerizing diene and propylene compounds in the presence of a transition metal catalyst composition including one or more cocatalyst compounds selected from the group consisting of the transition metal compound represented by Formula 1 above, the aluminum compound represented by Formula 2 above, the alkyl metal compound represented by Formula 3 above, and the boron compound represented by Formula 4.

A suitable polymerization process for copolymerization of diene and propylene is well-known to a person skilled in the art, and includes bulk polymerization, solution polymerization, slurry polymerization and low-pressure vapor polymerization. The metallocene catalyst composition is particularly useful in a well-known operation type using a fixed bed, a moving bed or a slurry process, which are performed in a single, series or parallel reactor.

In case where the polymerization reaction is performed in a liquid phase or a slurry phase, a solvent or a propylene and diene monomer itself may be used as a medium.

Since the catalyst composition suggested in the present invention is present in a uniform type in a polymerization reactor, the catalyst composition is preferably applied in a solution polymerization process which is performed at a temperature of the melting point or above of the polymer. However, as disclosed in U.S. Pat. No. 4,752,597, a non-uniform catalyst composition type which is obtained by supporting the transition metal catalyst and the cocatalyst on a porous metal oxide support may be used in a slurry polymerization or vapor polymerization process. Accordingly, if the catalyst composition of the present invention is used together with an inorganic support or an organic polymer support, it may be applied in a slurry or vapor phase process. That is, the transition metal compound and the cocatalyst compound may be used as a supported type in an inorganic support or an organic polymer support.

A solvent which can be used in the polymerization reaction may be an aliphatic hydrocarbon-based solvent, an aromatic hydrocarbon-based solvent, a halogenated aliphatic hydrocarbon-based solvent, or a mixture thereof. Here, non-limiting examples of the aliphatic hydrocarbon-based solvent may include pentane, hexane, heptane, octane, nonane, decane, undecane, dodecane, cyclopentane, methylcyclopentane, cyclohexane, etc. In addition, non-limiting examples of the aromatic hydrocarbon-based solvent may include benzene, monochlorobenzene, dichlorobenzene, trichlorobenzene, toluene, xylene, chlorobenzene, etc. In addition, non-limiting examples of the halogenated aliphatic hydrocarbon-based solvent may include dichloromethane, trichloromethane, dichloroethane, trichloroethane, 1,2-dichloroethane, etc.

According to an embodiment of the present invention, a method for preparing a diene-modified polypropylene may be carried out by polymerizing propylene and diene compounds in the presence of the transition metal catalyst composition. In this case, the transition metal catalyst and the cocatalyst components may be separately injected into a reactor, or each component may be mixed in advance and then injected to the reactor. Mixing conditions such as injection order, temperature, or concentration are not specifically limited.

The diene compound may be at least one selected from among an aliphatic diene compound and aromatic diene compound having 4 to 20 carbon atoms, for example, a single one selected from the group consisting of 1,5-hexadiene, 1,6-heptadiene, 1,7-octadiene, 1,8-nonadiene, 1,9-decadiene, 1,10-undecadiene, 1,11-dodecadiene, 1,12-tridecadiene and 1,13-tetradecadiene, or a mixture of two or more thereof. Most preferably, the diene compound may be 1,5-hexadiene.

In this case, the polymerization reaction can be performed by adding the diene of 0.008-0.25 mole, preferably 0.008-0.20 mole, more preferably 0.025-0.20 mole, even more preferably 0.04-0.020 mole, and most preferably 0.04-0.15 mole with respect to 500 g of the propylene.

Meanwhile, when the catalyst according to the present invention includes the transition metal compound represented by Formula 6 above, the polymerization reaction can be performed by adding the diene of 0.004-0.4 mole, preferably 0.008-0.3 mole, more preferably 0.016-0.2 mole, and most preferably 0.04-0.13 mole with respect to 500 g of the propylene.

If the diene exceeds the above content, the catalyst activity may be deteriorated, or the undesired thermal characteristics in terms of improving an ARES melt strength may be shown.

Meanwhile, in the polymerization reaction of the present invention, the added amount of the catalyst may be determined in a range where the polymerization reaction of a monomer may be sufficiently carried out according to a slurry phase, liquid phase, vapor phase or bulk phase process, and thus is not specifically limited. However, the added amount of the catalyst is preferably $10^{-8}$ mol/L to 1 mol/L, more preferably, $10^{-7}$ mol/L to $10^{-1}$ mol/L, and even more preferably, $10^{-7}$ mol/L to $10^{-2}$ mol/L, based on the concentration of a central metal (M) in a main catalyst compound (transition metal compound) per unit volume (L) of the monomer. In the method according to the present invention, the catalyst activity may be preferably 22-40 kg/gCat·hr, more preferably 26-40 kg/gCat·hr, and most preferably 30-40 kg/gCat·hr.

In addition, the polymerization reaction of the present invention is performed by a batch type, a semi-continuous type or a continuous type reaction, preferably, a continuous type reaction.

The temperature and pressure conditions of the polymerization reaction of the present invention may be determined by considering the efficiency of the polymerization reaction according to the kind of the reaction and the kind of the reactor, but the polymerization temperature may be 40-150° C., preferably, 60-100° C., and the pressure may be 1-100 atm, preferably, 5-50 atm.

A diene-modified polypropylene prepared according to the method of the present invention may have high polymerization activity of diene and propylene and exhibit a low gel content and high-melt strength using a catalyst including a main catalyst compound and a cocatalyst compound.

In addition, the present invention has the advantage of being able to prepare polypropylene by means of one-step in-situ polymerization reaction, the polypropylene exhibiting a low gel content and high-melt strength only by directly contacting the propylene and diene compounds with the metallocene catalyst without an additional step, such as electron beam irradiation.

In this case, the diene-modified polypropylene has a branching index of 0.95 or less, a gel content of 3 wt % or less, and an advanced rheometric expansion system (ARES) melt strength of 5 g or more.

In this case, the diene-modified polypropylene preferably may have a gel content of 2 wt % or less, and most preferably 1 wt % or less.

Meanwhile, when the metallocene catalyst according to the present invention includes the transition metal compound represented by Formula 6 above, the diene-modified polypropylene preferably may have a gel content of 2 wt % or less, more preferably 1 wt % or less, and most preferably 0.5 wt % or less.

In addition, the diene-modified polypropylene preferably may have an ARES melt strength of 10 g or more, more preferably 20 g or more, even more preferably 30 g or more, and most preferably 40 g or more.

Meanwhile, when the metallocene catalyst according to the present invention includes the transition metal compound represented by Formula 6 above, the diene-modified polypropylene preferably may have an ARES melt strength of 10 g or more, more preferably 20 g or more, and most preferably 30 g or more.

In addition, the diene-modified polypropylene prepared according to the present invention may have a weight average molecular weight of 10,000-1,000,000, preferably 200,000-1,000,000, more preferably 300,000-1,000,000, and most preferably 300,000-900,000.

In addition, the diene-modified polypropylene preferably may have a molecular weight distribution (Mw/Mn) of 1-30, more preferably 2-20, and most preferably 3-10.

Meanwhile, when the metallocene catalyst according to the present invention includes the transition metal compound represented by Formula 6 above, the diene-modified polypropylene preferably may have a molecular weight distribution (Mw/Mn) of 3-30, more preferably 3-20, even more preferably 3-15, and most preferably 4-10.

Meanwhile, when the metallocene catalyst according to the present invention includes the transition metal compound represented by Formula 6 above, the diene-modified polypropylene preferably may have a branching index of 0.9 or less, more preferably 0.85 or less, and most preferably 0.75 or less.

In addition, the diene-modified polypropylene may have a melting point of 160° C. or lower, and preferably 155° C. or lower.

There is no limitation in the field in which products, such as plastic molded articles, in which the polypropylene resin prepared according to the present invention is used, are employed. However, the products may be preferably used mainly for automobile interior and exterior materials, and specifically for automobile interior foam film/sheet, shock-absorbing materials, thermoforming products, trays, sound insulating materials, insulation materials, large hollows, and automobile parts.

Hereinafter, preferred embodiments according to the present invention will be explained.

Unless otherwise separately stated, all synthetic experiments of ligands and catalysts were performed in a nitrogen atmosphere using a standard Schlenk or glove box technique, organic solvents used in all reactions were used after removing moisture by refluxing in a sodium metal and benzophenone and by distilling immediately before the use. 1H-NMR analysis of the ligands and catalysts synthesized was performed at room temperature using Bruker 300 MHz.

A polymerization solvent, n-hexane, was used after passing through a column filled with 5A molecular sieves and active alumina, bubbling with high purity nitrogen to sufficiently remove moisture, oxygen and other catalyst poison materials. All polymerization reactions were performed in a high pressure autoclave which was completely blocked from exterior air after injecting a solvent, a cocatalyst, each monomer for polymerization, etc. in amounts required, and putting a catalyst in. The resulting polymers were analyzed by the methods below.

(1) Weight Average Molecular Weight (Mw) and Molecular Weight Distribution (MWD)

Measurement was performed using PL210 GPC equipped with PL Mixed-BX2+preCol at 135° C. at a rate of 1.0 ml/min in a 1,2,3-trichlorobenzene solvent, and a molecular weight was calibrated using a PL polystyrene standard material.

(2) Melting Point (Tm) Analysis

Measurement was performed using Dupont DSC2910 in a nitrogen atmosphere at the rate of 10° C./min in the 2nd heating condition.

(3) Branching Index

Viscosity of each of branched PP and linear PP was measured and a branching index was calculated according to Equation 1 below:

$$g' = \frac{[\eta]_{branched}}{[\eta]_{linear}} \quad \text{[Equation 1]}$$

(4) Gel Content

A gel content was measured according to ASTM D2765 method. The dried product was pulverized, added in xylene, and extracted at a boiling point for 12 hours to measure the remaining amount. At this time, the percentage of the remaining sample after extraction with respect to the weight of the sample before extraction was defined as a gel content.

(5) Melt Index (MI)

According to ASTM D 1238, after heating a resin to 230° C. for 0 min, a piston of 2.16 kg was put on a proper position in a cylinder, and a weight of the resin passed through an orifice (inner diameter: 2.09 mm, length: 8 mm) for a certain time (minute unit) was measured and converted into a passing amount for 10 minutes.

(6) ARES (Advanced Rheometric Expansion System) Melt Strength

A specimen, which has the width of 20 mm, the length of 10 mm and the thickness of 7 mm, prepared through hot press melting or injection was fixed to a sample holder using a rheometric measurement instrument (2KFRTN, TA Instrument), and then, the ARES melt strength was measured as the resistance value which is applied to the specimen when the sample holder was rotated about an axis.

Catalyst Preparation Example 1

Synthesis of Transition Metal Compound [4-butyl-2-methylcyclopentadienyl dimethylsilyl 2-methyl-4-(4-tert-butylphenyl)indenyl Zr Dichloride]

1) Synthesis of Dimethyl 4-butyl-2-methylcyclopentadienyl Chlorosilane

To a 2-L flask, tetrahydrofuran (600 ml) and 1-butyl-3-methylcyclopentadiene (50 g) were added, and in a nitrogen atmosphere at −10° C., n-BuLi (2.5 M hexane solution) (170 ml) was slowly added dropwise thereto, and the reaction was carried out by stirring at room temperature for 12 hours. The temperature of the reaction solution was decreased to 10° C. again, and dimethyl dichlorosilane (170 g) was added, followed by stirring and reacting at room temperature for 12 hours. Then, the reaction product was dried in vacuum. n-hexane (500 ml) was injected thereto to dissolve the reaction product, and filtering was performed using a celite filter. The filtrate was dried in vacuum to obtain 70 g of dimethyl 4-butyl-2-methylcyclopentadienyl chlorosilane in the form of a yellow oil (yield: 70%).

2) Synthesis of Dimethyl 4-butyl-2-methylcyclopentadienyl 2-methyl-4-(4-tert-butylphenyl)indenyl Silane A flask to which toluene (200 ml), tetrahydrofuran (40 ml) and 2-methyl-4-(4-tert-butylphenyl)indene (50 g) were injected, was cooled to −10° C., and n-BuLi (2.5 M hexane solution) (76 ml) was slowly added dropwise thereto, followed by stirring at room temperature for 12 hours. The temperature of the reaction product was decreased to −10° C. again, and dimethyl tetramethylcyclopentadienyl chlorosilane (38 g) was injected, and the reaction was carried out by stirring at room temperature for 12 hours. After the reaction was completed, water (400 ml) was injected thereto and stirred at room temperature for 1.5 hours. The mixture was extracted with toluene and dried in vacuum to obtain 80 g of dimethyl 4-butyl-2-methylcyclopentadienyl 2-methyl-4-(4-tert-butylphenyl)indenyl silane in the form of a yellow oil (yield: 95%).

3) Synthesis of 4-butyl-2-methylcyclopentadienyl dimethylsilyl 2-methyl-4-(4-tert-butylphenyl)indenyl Zr Dichloride Dimethyl 4-butyl-2-methylcyclopentadienyl 2-methyl-4-(4-tert-butylphenyl)indenyl silane (50 g), toluene (300 ml) and diethyl ether (100 ml) were added to a flask and cooled to −10° C. Then, n-BuLi (2.5 M hexane solution) (90 ml) was slowly added dropwise thereto. After finishing the dropwise addition, the reaction temperature was elevated to room temperature, and stirring for 48 hours and filtering were performed. The filtrate thus obtained was dried in vacuum to obtain 40 g of a 4-butyl-2-methylcyclopentadienyl dimethylsilyl 2-methyl-4-(4-tert-butylphenyl)indenyl dilithium salt in the form of a solid (yield: 80%), and this product was used directly in a subsequent reaction without purification.

The 4-butyl-2-methylcyclopentadienyl dimethylsilyl 2-methyl-4-(4-tert-butylphenyl)indenyl dilithium salt (40 g), toluene (40 ml) and ether (10 ml) were put in flask #1 and stirred. In flask #2, a mixture solution of toluene (30 ml) and ZrCl$_4$ (20 g) was prepared. The mixture solution in flask #2 was slowly added dropwise to flask #1 using a cannular, and the reactant was stirred at room temperature for 24 hours. After finishing the stirring, the resultant product was dried in vacuum, extracted with methylene chloride (500 ml) and filtered using a celite filter. Then, the filtrate was dried in vacuum. The solid thus obtained was washed using a 1:3 mixture solution (50 ml) of methylene chloride and n-hexane and then dried in vacuum to obtain 32 g of 4-butyl-2-methylcyclopentadienyl dimethylsilyl 2-methyl-4-(4-tert-butylphenyl)indenyl Zr dichloride in the form of a yellow solid (yield 60%).

Preparation of Supported Catalyst

In a glove box, to a Schlenk flask (100 ml), silica (manufacturer: Grace, product name: XPO-2412, 2.0 g) was put, and 10 ml of an anhydrous toluene solution was added thereto. About 10.2 ml of methylaluminoxane (a 10 wt % methylaluminoxane solution in toluene, 15 mmol based on Al, manufacturer: Albemarle) was slowly added dropwise thereto at 10° C., followed by stirring at 0° C. for about 1 hour, and then, the temperature was elevated to 70° C., and stirring was performed for 3 hours, and the temperature was decreased to 25° C. Separately, in a glove box, the synthesized transition metal compound (0.061 g, 100 μmol) was put in another 100 ml Schlenk flask, and this flask was taken out of the glove box, and then, 10 ml of an anhydrous toluene solution was added. A solution including the transition metal compound was slowly added to a solution including silica and methylaluminoxane at 10° C., and then, the temperature was elevated to 70° C., stirring was performed for 1 hour, the temperature was then decreased to 25° C., and stirring was performed for about 24 hours. Then, the resultant product of the reaction was dried in vacuum to obtain 2.70 g of a free flowing supported catalyst.

Catalyst Preparation Example 2

Synthesis of Transition Metal Compound [tetramethylcyclopentadienyl dimethylsilyl 2-methyl-4-(4-tert-butylphenyl)indenyl Zr Dichloride]

1) Synthesis of Dimethyl Tetramethylcyclopentadienyl Chlorosilane

To a 2-L flask, tetrahydrofuran (600 ml) and tetramethylcyclopentadiene (50 g) were added, and in a nitrogen atmosphere at −10° C., n-BuLi (2.5 M hexane solution) (170 ml) was slowly added dropwise thereto and then stirred and reacted at room temperature for 12 hours. The temperature of the reaction solution was decreased to −10° C. again, and dimethyl dichlorosilane (170 g) was added, followed by stirring and reacting at room temperature for 12 hours. Then, the reaction product was dried in vacuum. n-hexane (500 ml) was injected thereto to dissolve the reaction product, and filtering was performed using a celite filter. The filtrate was dried in vacuum to obtain 70 g of dimethyl tetramethylcyclopentadienyl chlorosilane in the form of a yellow oil (yield: 80%).

1H-NMR (300 MHz, CDCl3) δ 0.235 (s, 6H), 1.81 (s, 6H), 1.97 (s, 6H), 3.07 (s, 1H)

2) Synthesis of Dimethyl tetramethylcyclopentadienyl 2-methyl-4-(4-tert-butylphenyl)indenyl Silane A flask to which toluene (200 ml), tetrahydrofuran (40 ml) and 2-methyl-4-(4-tert-butylphenyl)indene (50 g) were injected, was cooled to −10° C., and n-BuLi (2.5 M hexane solution) (76 ml) was slowly added dropwise thereto, followed by stirring at room temperature for 12 hours. The temperature of the reaction product was decreased to −10° C. again, and dimethyl tetramethylcyclopentadienyl chlorosilane (38 g) was injected, and the reaction was carried out by stirring at room temperature for 12 hours. After the reaction was completed, water (400 ml) was injected thereto and stirred at room temperature for 1.5 hours. The mixture was extracted with toluene and dried in vacuum to obtain 80 g of dimethyl tetramethylcyclopentadienyl 2-methyl-4-(4-tert-butylphenyl)indenyl silane in the form of a yellow oil (yield: 95%).

1H-NMR (300 MHz, CDCl3) δ 0.2-0.23 (d, 6H), 1.44 (s, 9H), 1.91 (s, 6H), 2.05-2.08 (d, 6H), 2.29 (s, 3H), 2.41 (s, 1H), 3.76 (s, 1H), 6.87 (s, 1H)

3) Synthesis of Tetramethylcyclopentadienyl dimethylsilyl 2-methyl-4-(4-tert-butylphenyl)indenyl Zr Dichloride Dimethyl tetramethylcyclopentadienyl 2-methyl-4-(4-tert-butylphenyl)indenyl silane (50 g), toluene (300 ml) and diethyl ether (100 ml) were added to a flask and cooled to −10° C. Then, n-BuLi (2.5 M hexane solution) (90 ml) was slowly added dropwise thereto. After finishing the dropwise addition, the reaction temperature was elevated to room temperature, and stirring for 48 hours and filtering were performed. The filtrate thus obtained was dried in vacuum to obtain 40 g of a tetramethylcyclopentadienyl dimethylsilyl 2-methyl-4-(4-tert-butylphenyl)indenyl dilithium salt as a solid type (yield 80%), and this product was used in a subsequent reaction without purification.

The tetramethylcyclopentadienyl dimethylsilyl 2-methyl-4-(4-tert-butylphenyl)indenyl dilithium salt (40 g), toluene (40 ml) and ether (10 ml) were put in flask #1 and stirred. In flask #2, a mixture solution of toluene (30 ml) and ZrCl$_4$ (20 g) was prepared. The mixture solution in flask #2 was slowly added dropwise to flask #1 using a cannular, and the reactant was stirred at room temperature for 24 hours. After finishing the stirring, the resultant product was dried in vacuum, extracted with methylene chloride (500 ml) and filtered using a celite filter. Then, the filtrate was dried in vacuum. The solid thus obtained was washed using a 1:3 mixture solution (50 ml) of methylene chloride and n-hexane and then dried in vacuum to obtain 32 g of tetramethylcyclopentadienyl dimethylsilyl 2-methyl-4-(4-tert-butylphenyl)indenyl Zr dichloride in the form of a yellow solid (yield 60%).

1H-NMR (300 MHz, CDCl3) δ 1.09 (s, 3H), 1.202 (s, 3H), 1.346 (s, 9H), 1.887-1.911 (d, 6H), 1.989 (s, 3H), 2.075 (s, 3H), 2.278 (s, 3H), 7.0-7.628 (m, 8H)

Preparation of Supported Catalyst

In a glove box, to a Schlenk flask (100 ml), silica (manufacturer: Grace, product name: XPO-2412, 2.0 g) was put, and 10 ml of an anhydrous toluene solution was added thereto. About 10.2 ml of methylaluminoxane (a 10 wt % methylaluminoxane solution in toluene, 15 mmol based on Al, manufacturer: Albemarle) was slowly added dropwise thereto at 10° C., followed by stirring at 0° C. for about 1 hour, and then, the temperature was elevated to 70° C., and stirring was performed for 3 hours, and the temperature was decreased to 25° C. Separately, in a glove box, the synthesized transition metal compound (0.060 g, 100 μmol) was put in another 100 ml Schlenk flask, and this flask was taken out of the glove box, and then, 10 ml of an anhydrous toluene solution was added. A solution including the transition metal compound was slowly added to a solution including silica and methylaluminoxane at 10° C., and then, the temperature was elevated to 70° C., stirring was performed for 1 hour, the temperature was then decreased to 25° C., and stirring was performed for about 24 hours. Then, the resultant product of the reaction was dried in vacuum to obtain 2.70 g of a free flowing supported catalyst.

Catalyst Preparation Example 3

Synthesis of Transition Metal Compound [1,3,4-trimethylcyclopentadienyl dimethylsilyl 2-methyl-4-(4-tert-butylphenyl)indenyl Zr Dichloride]

1) Synthesis of Dimethyl 1,3,4-trimethylcyclopentadienyl Chlorosilane

To a 2-L flask, tetrahydrofuran (600 ml) and 1,3,4-trimethylcyclopentadiene (50 g) were added, and in a nitrogen atmosphere at −10° C., n-BuLi (2.5 M hexane solution) (170 ml) was slowly added dropwise thereto, and the reaction was carried out by stirring at room temperature for 12 hours. The temperature of the reaction solution was decreased to 10° C. again, and dimethyl dichlorosilane (170 g) was added, followed by stirring and reacting at room temperature for 12 hours. Then, the reaction product was dried in vacuum. n-hexane (500 ml) was injected thereto to dissolve the reaction product, and filtering was performed using a celite filter. The filtrate was dried in vacuum to obtain 70 g of dimethyl 1,3,4-trimethylcyclopentadienyl chlorosilane in the form of a yellow oil (yield: 80%).

2) Synthesis of Dimethyl 1,3,4-trimethylcyclopentadienyl 2-methyl-4-(4-tert-butylphenyl)indenyl Silane A flask to which toluene (200 ml), tetrahydrofuran (40 ml) and 2-methyl-4-(4-tert-butylphenyl)indene (50 g) were injected, was cooled to −10° C., and n-BuLi (2.5 M hexane solution) (76 ml) was slowly added dropwise thereto, followed by stirring at room temperature for 12 hours. The temperature of the reaction product was decreased to −10° C. again, and dimethyl 1,3,4-trimethylcyclopentadienyl chlorosilane (38 g) was injected, and the reaction was carried out by stirring at room temperature for 12 hours. After the reaction was completed, water (400 ml) was injected thereto and stirred at room temperature for 1.5 hours. The mixture was extracted with toluene and dried in vacuum to obtain 80 g of dimethyl 1,3,4-trimethylcyclopentadienyl 2-methyl-4-(4-tert-butylphenyl)indenyl silane in the form of a yellow oil (yield: 95%).

3) Synthesis of 1,3,4-trimethylcyclopentadienyl dimethylsilyl 2-methyl-4-(4-tert-butylphenyl)indenyl Zr Dichloride Dimethyl 1,3,4-trimethylcyclopentadienyl 2-methyl-4-(4-tert-butylphenyl)indenyl silane (50 g), toluene (300 ml) and diethyl ether (100 ml) were added to a flask and cooled to −10° C. Then, n-BuLi (2.5 M hexane solution) (90 ml) was slowly added dropwise thereto. After finishing the dropwise addition, the reaction temperature was elevated to room temperature, and stirring for 48 hours and filtering were performed. The filtrate thus obtained was dried in vacuum to obtain 40 g of a 1,3,4-trimethylcyclopentadienyl dimethylsilyl 2-methyl-4-(4-tert-butylphenyl)indenyl dilithium salt in the form of a solid (yield: 80%), and this product was used directly in a subsequent reaction without purification.

The 1,3,4-trimethylcyclopentadienyl dimethylsilyl 2-methyl-4-(4-tert-butylphenyl)indenyl dilithium salt (40 g), toluene (40 ml) and ether (10 ml) were put in flask #1 and stirred. In flask #2, a mixture solution of toluene (30 ml) and ZrCl₄ (20 g) was prepared. The mixture solution in flask #2 was slowly added dropwise to flask #1 using a cannular, and the reactant was stirred at room temperature for 24 hours. After finishing the stirring, the resultant product was dried in vacuum, extracted with methylene chloride (500 ml) and filtered using a celite filter. Then, the filtrate was dried in vacuum. The solid thus obtained was washed using a 1:3 mixture solution (50 ml) of methylene chloride and n-hexane and then dried in vacuum to obtain 32 g of 1,3,4-trimethylcyclopentadienyl dimethylsilyl 2-methyl-4-(4-tert-butylphenyl)indenyl Zr dichloride in the form of a yellow solid (yield 60%).

Preparation of Supported Catalyst

In a glove box, to a Schlenk flask (100 ml), silica (manufacturer: Grace, product name: XPO-2412, 2.0 g) was put, and 10 ml of an anhydrous toluene solution was added thereto. About 10.2 ml of methylaluminoxane (a 10 wt % methylaluminoxane solution in toluene, 15 mmol based on Al, manufacturer: Albemarle) was slowly added dropwise thereto at 10° C., followed by stirring at 0° C. for about 1 hour, and then, the temperature was elevated to 70° C., and stirring was performed for 3 hours, and the temperature was decreased to 25° C. Separately, in a glove box, the synthesized transition metal compound (0.060 g, 100 μmol) was put in another 100 ml Schlenk flask, and this flask was taken out of the glove box, and then, 10 ml of an anhydrous toluene solution was added. A solution including the transition metal compound was slowly added to a solution including silica and methylaluminoxane at 10° C., and then, the temperature was elevated to 70° C., stirring was performed for 1 hour, the temperature was then decreased to 25° C., and stirring was performed for about 24 hours. Then, the resultant product of the reaction was dried in vacuum to obtain 2.70 g of a free flowing supported catalyst.

Catalyst Preparation Example 4

Synthesis of Transition Metal Compound [4-butyl-2-methylcyclopentadienyl dimethylsilyl 2-methyl-4-(4-tert-butylphenyl)indenyl Zr Ditetrahydrobrate]

1) Synthesis of Dimethyl 4-butyl-2-methylcyclopentadienyl Chlorosilane

To a 2-L flask, tetrahydrofuran (600 ml) and 1-butyl-3-methylcyclopentadiene (50 g) were added, and in a nitrogen atmosphere at −10° C., n-BuLi (2.5 M hexane solution) (170 ml) was slowly added dropwise thereto, and the reaction was carried out by stirring at room temperature for 12 hours. The temperature of the reaction solution was decreased to 10° C. again, and dimethyl dichlorosilane (170 g) was added, followed by stirring and reacting at room temperature for 12 hours. Then, the reaction product was dried in vacuum. n-hexane (500 ml) was injected thereto to dissolve the reaction product, and filtering was performed using a celite filter. The filtrate was dried in vacuum to obtain 70 g of dimethyl 4-butyl-2-methylcyclopentadienyl chlorosilane in the form of a yellow oil (yield: 70%).

2) Synthesis of Dimethyl 4-butyl-2-methylcyclopentadienyl 2-methyl-4-(4-tert-butylphenyl)indenyl Silane A flask to which toluene (200 ml), tetrahydrofuran (40 ml) and 2-methyl-4-(4-tert-butylphenyl)indene (50 g) were injected, was cooled to −10° C., and n-BuLi (2.5 M hexane solution) (76 ml) was slowly added dropwise thereto, followed by stirring at room temperature for 12 hours. The temperature of the reaction product was decreased to −10°

C. again, and dimethyl tetramethylcyclopentadienyl chlorosilane (38 g) was injected, and the reaction was carried out by stirring at room temperature for 12 hours. After the reaction was completed, water (400 ml) was injected thereto and stirred at room temperature for 1.5 hours. The mixture was extracted with toluene and dried in vacuum to obtain 80 g of dimethyl 4-butyl-2-methylcyclopentadienyl 2-methyl-4-(4-tert-butylphenyl)indenyl silane in the form of a yellow oil (yield 95%).

3) Synthesis of 4-butyl-2-methylcyclopentadienyl dimethylsilyl 2-methyl-4-(4-tert-butylphenyl)indenyl Zr Dichloride Dimethyl 4-butyl-2-methylcyclopentadienyl 2-methyl-4-(4-tert-butylphenyl)indenyl silane (50 g), toluene (300 ml) and diethyl ether (100 ml) were added to a flask and cooled to −10° C. Then, n-BuLi (2.5 M hexane solution) (90 ml) was slowly added dropwise thereto. After finishing the dropwise addition, the reaction temperature was elevated to room temperature, and stirring for 48 hours and filtering were performed. The filtrate thus obtained was dried in vacuum to obtain 40 g of a 4-butyl-2-methylcyclopentadienyl dimethylsilyl 2-methyl-4-(4-tert-butylphenyl)indenyl dilithium salt in the form of a solid (yield 80%), and this product was used directly in a subsequent reaction without purification.

The 4-butyl-2-methylcyclopentadienyl dimethylsilyl 2-methyl-4-(4-tert-butylphenyl)indenyl dilithium salt (40 g), toluene (40 ml) and ether (10 ml) were put in flask #1 and stirred. In flask #2, a mixture solution of toluene (30 ml) and $ZrCl_4$ (20 g) was prepared. The mixture solution in flask #2 was slowly added dropwise to flask #1 using a cannular, and the reactant was stirred at room temperature for 24 hours. After finishing the stirring, the resultant product was dried in vacuum, extracted with methylene chloride (500 ml) and filtered using a celite filter. Then, the filtrate was dried in vacuum. The solid thus obtained was washed using a 1:3 mixture solution (50 ml) of methylene chloride and n-hexane and then dried in vacuum to obtain 32 g of 4-butyl-2-methylcyclopentadienyl dimethylsilyl 2-methyl-4-(4-tert-butylphenyl)indenyl Zr dichloride in the form of a yellow solid (yield 60%).

4) Synthesis of 4-butyl-2-methylcyclopentadienyl dimethylsilyl 2-methyl-4-(4-tert-butylphenyl)indenyl Zr Ditetrahydrobrate 4-butyl-2-methylcyclopentadienyl dimethylsilyl 2-methyl-4-(4-tert-butylphenyl)indenyl Zr dichloride (5.2 g), sodium tetraborate (1.5 g), and tetrahydrofuran (100 ml) were added in a flask, and reacted at room temperature for 12 hours. Then, a solid portion was filtered, and the solution portion thus obtained was dried in vacuum to obtain a white solid. The white solid thus obtained was transferred to a flask with 500 ml of diethyl ether, and then stirred at room temperature for 5 hours. Then, an insoluble portion was removed by using a filter, and diethyl ether was volatilized in vacuum to obtain 3.4 g of 4-butyl-2-methylcyclopentadienyl dimethylsilyl 2-methyl-4-(4-tert-butylphenyl)indenyl Zr ditetrahydrobrate.

Preparation of Supported Catalyst

In a glove box, to a Schlenk flask (100 ml), silica (manufacturer: Grace, product name: XPO-2412, 2.0 g) was put, and 10 ml of an anhydrous toluene solution was added thereto. About 10.2 ml of methylaluminoxane (a 10 wt % methylaluminoxane solution in toluene, 15 mmol based on Al, manufacturer: Albemarle) was slowly added dropwise thereto at 10° C., followed by stirring at 0° C. for about 1 hour, and then, the temperature was elevated to 70° C., and stirring was performed for 3 hours, and the temperature was decreased to 25° C. Separately, in a glove box, the synthesized 4-butyl-2-methylcyclopentadienyl dimethylsilyl 2-methyl-4-(4-tert-butylphenyl)indenyl Zr ditetrahydrobrate (0.056 g, 100 μmol) was put in another 100 ml Schlenk flask, and this flask was taken out of the glove box, and then, 10 ml of an anhydrous toluene solution was added. A solution including the transition metal compound was slowly added to a solution including silica and methylaluminoxane at 10° C., and then, the temperature was elevated to 70° C., stirring was performed for 1 hour, the temperature was then decreased to 25° C., and stirring was performed for about 24 hours. Then, the resultant product of the reaction was washed with a sufficient amount of toluene and hexane to remove an unreacted aluminum compound. Then, the resultant product of the reaction was dried in vacuum to obtain 2.70 g of a free flowing supported catalyst.

Catalyst Preparation Example 5

Synthesis of Transition Metal Compound [4-butyl-2-methylcyclopentadienyl dimethylsilyl 2-methyl-4-(4-tert-butylphenyl)indenyl Zr Ditetrahydrobrate]

1) Synthesis of Dimethyl 1,3,4-trimethylcyclopentadienyl Chlorosilane

To a 2-L flask, tetrahydrofuran (600 ml) and 1,3,4-trimethylcyclopentadiene (50 g) were added, and in a nitrogen atmosphere at −10° C., n-BuLi (2.5 M hexane solution) (170 ml) was slowly added dropwise thereto, and the reaction was carried out by stirring at room temperature for 12 hours. The temperature of the reaction solution was decreased to −10° C. again, and dimethyl dichlorosilane (170 g) was added, followed by stirring and reacting at room temperature for 12 hours. Then, the reaction product was dried in vacuum. n-hexane (500 ml) was injected thereto to dissolve the reaction product, and filtering was performed using a celite filter. The filtrate was dried in vacuum to obtain 70 g of dimethyl 1,3,4-trimethylcyclopentadienyl chlorosilane in the form of a yellow oil (yield: 80%).

2) Synthesis of Dimethyl 1,3,4-trimethylcyclopentadienyl 2-methyl-4-(4-tert-butylphenyl)indenyl Silane A flask to which toluene (200 ml), tetrahydrofuran (40 ml) and 2-methyl-4-(4-tert-butylphenyl)indene (50 g) were injected, was cooled to −10° C., and n-BuLi (2.5 M hexane solution) (76 ml) was slowly added dropwise thereto, followed by stirring at room temperature for 12 hours. The temperature of the reaction product was decreased to −10° C. again, and dimethyl 1,3,4-trimethylcyclopentadienyl chlorosilane (38 g) was injected, and the reaction was carried out by stirring at room temperature for 12 hours. After the reaction was completed, water (400 ml) was injected thereto and stirred at room temperature for 1.5 hours. The mixture was extracted with toluene and dried in vacuum to obtain 80 g of dimethyl 1,3,4-trimethylcyclopentadienyl 2-methyl-4-(4-tert-butylphenyl)indenyl silane in the form of a yellow oil (yield 95%).

3) Synthesis of 1,3,4-trimethylcyclopentadienyl dimethylsilyl 2-methyl-4-(4-tert-butylphenyl)indenyl Zr Dichloride Dimethyl 1,3,4-trimethylcyclopentadienyl 2-methyl-4-(4-tert-butylphenyl)indenyl silane (50 g), toluene (300 ml) and diethyl ether (100 ml) were added to a flask and cooled to −10° C. Then, n-BuLi (2.5 M hexane solution) (90 ml) was slowly added dropwise thereto. After finishing the dropwise addition, the reaction temperature was elevated to room temperature, and stirring for 48 hours and filtering were performed. The filtrate thus obtained was dried in vacuum to obtain 40 g of a 1,3,4-trimethylcyclopentadienyl dimethylsilyl 2-methyl-4-(4-tert-butylphenyl)indenyl dilithium salt in the form of a solid (yield 80%), and this product was used directly in a subsequent reaction without purification.

The 1,3,4-trimethylcyclopentadienyl dimethylsilyl 2-methyl-4-(4-tert-butylphenyl)indenyl dilithium salt (40 g), toluene (40 ml) and ether (10 ml) were put in flask #1 and stirred. In flask #2, a mixture solution of toluene (30 ml) and $ZrCl_4$ (20 g) was prepared. The mixture solution in flask #2 was slowly added dropwise to flask #1 using a cannular, and the reactant was stirred at room temperature for 24 hours. After finishing the stirring, the resultant product was dried in vacuum, extracted with methylene chloride (500 ml) and filtered using a celite filter. Then, the filtrate was dried in vacuum. The solid thus obtained was washed using a 1:3 mixture solution (50 ml) of methylene chloride and n-hexane and then dried in vacuum to obtain 32 g of 1,3,4-trimethylcyclopentadienyl dimethylsilyl 2-methyl-4-(4-tert-butylphenyl)indenyl Zr dichloride in the form of a yellow solid (yield 60%).

4) Synthesis of 4-butyl-2-methylcyclopentadienyl dimethylsilyl 2-methyl-4-(4-tert-butylphenyl)indenyl Zr Ditetrahydrobrate 1,3,4-trimethylcyclopentadienyl dimethylsilyl 2-methyl-4-(4-tert-butylphenyl)indenyl Zr dichloride (5.2 g), sodium tetraborate (1.5 g), and tetrahydrofuran (100 ml) were added in a flask, and reacted at room temperature for 12 hours. Then, a solid portion was filtered, and the solution portion thus obtained was dried in vacuum to obtain a white solid. The white solid thus obtained was transferred to a flask with 500 ml of diethyl ether, and then stirred at room temperature for 5 hours. Then, an insoluble portion was removed by using a filter, and diethyl ether was volatilized in vacuum to obtain 3.4 g of 1,3,4-trimethylcyclopentadienyl dimethylsilyl 2-methyl-4-(4-tert-butylphenyl)indenyl Zr ditetrahydrobrate.

<Preparation of Supported Catalyst>

In a glove box, to a Schlenk flask (100 ml), silica (manufacturer: Grace, product name: XPO-2412, 2.0 g) was put, and 10 ml of an anhydrous toluene solution was added thereto. About 10.2 ml of methylaluminoxane (a 10 wt % methylaluminoxane solution in toluene, 15 mmol based on Al, manufacturer: Albemarle) was slowly added dropwise thereto at 10° C., followed by stirring at 0° C. for about 1 hour, and then, the temperature was elevated to 70° C., and stirring was performed for 3 hours, and the temperature was decreased to 25° C. Separately, in a glove box, the synthesized 4-butyl-2-methylcyclopentadienyl dimethylsilyl 2-methyl-4-(4-tert-butylphenyl)indenyl Zr ditetrahydrobrate (0.056 g, 100 μmol) was put in another 100 ml Schlenk flask, and this flask was taken out of the glove box, and then, 10 ml of an anhydrous toluene solution was added. A solution including the transition metal compound was slowly added to a solution including silica and methylaluminoxane at 10° C., and then, the temperature was elevated to 70° C., stirring was performed for 1 hour, the temperature was then decreased to 25° C., and stirring was performed for about 24 hours. Then, the resultant product of the reaction was washed with a sufficient amount of toluene and hexane to remove an unreacted aluminum compound. Then, the resultant product of the reaction was dried in vacuum to obtain 2.70 g of a free flowing supported catalyst.

Embodiments 1 to 30 and Comparative Examples 1 to 2

A polypropylene was prepared by adjusting a supported catalyst, a feeding amount of diene, and a feeding amount of hydrogen according to Table 1 below.

Specifically, at room temperature, the inside of a stainless steel autoclave with an internal volume of 3 L was completely substituted with nitrogen. While keeping nitrogen purging, 2 mmol of triisobutylaluminum (manufacturer: Aldrich), 1,5-hexadiene, and 500 g of propylene were injected thereto in this order, followed by raising the temperature to 40° C.

0.05 g of the supported catalyst prepared in Catalyst Preparation Example 1, 2, or 3 above with 6 ml of n-hexane was stirred in a flask, and the mixture was injected into a reactor. The preliminary polymerization was performed for 5 minutes, the temperature was raised to 70° C., and the polymerization reaction was performed for 1 hour. After the polymerization reaction was performed as described above, the temperature was lowered to room temperature, and then an excessive amount of propylene gas was discharged. Then, after polymer powder dispersed in a solvent was obtained by filtering, the polymer powder was heated at 80° C. in a vacuum oven and dried for 15 hours or more to prepare the final polypropylene resin.

Embodiments 31 to 40 and Comparative Examples 3 to 5

A polypropylene was prepared by adjusting a supported catalyst, a feeding amount of diene, and a feeding amount of hydrogen according to Table 3 below.

Specifically, at room temperature, the inside of a stainless steel autoclave with an internal volume of 3 L was completely substituted with nitrogen. While keeping nitrogen purging, 2 mmol of triisobutylaluminum (manufacturer: Aldrich), 1,5-hexadiene, and 500 g of propylene were injected thereto in this order, followed by raising the temperature to 40° C.

0.05 g of the supported catalyst prepared in Catalyst Preparation Example 4, or 5 above with 6 ml of n-hexane was stirred in a flask, and the mixture was injected into a reactor. The preliminary polymerization was performed for 5 minutes, the temperature was raised to 70° C., and the polymerization reaction was performed for 1 hour. After the polymerization reaction was performed as described above, the temperature was lowered to room temperature, and then an excessive amount of propylene gas was discharged. Then, after polymer powder dispersed in a solvent was obtained by filtering, the polymer powder was heated at 80° C. in a vacuum oven and dried for 15 hours or more to prepare the final polypropylene resin.

Results of measuring physical properties of the polypropylene resins prepared in Examples 1 to 40 and Comparative Examples 1 to 5 are shown in Table 2 and Table 4 below.

TABLE 1

| Division | Supported catalyst | Feeding amount of diene (mL) | Feeding amount of hydrogen (mg) | Molecular weight (Mw) | Molecular weight distribution | Tm (° C.) |
|---|---|---|---|---|---|---|
| Example 1 | Catalyst Preparation Example 1 | 1.0 | 0 | 625K | 4.9 | 152 |
| Example 2 | | 1.0 | 10 | 413K | 4.9 | 152 |
| Example 3 | | 2.0 | 0 | 674K | 5.4 | 152 |
| Example 4 | | 2.0 | 10 | 460K | 5.4 | 152 |
| Example 5 | | 5.0 | 0 | 767K | 6.4 | 152 |
| Example 6 | | 5.0 | 10 | 552K | 6.3 | 152 |
| Example 7 | | 10.0 | 0 | 884K | 7.2 | 152 |
| Example 8 | | 10.0 | 10 | 664K | 7.1 | 152 |
| Example 9 | | 15.0 | 0 | 1042K | 8.1 | 152 |
| Example 10 | | 15.0 | 10 | 782K | 8.1 | 152 |
| Example 11 | Catalyst Preparation Example 2 | 1.0 | 0 | 437K | 4.4 | 152 |
| Example 12 | | 1.0 | 10 | 301K | 4.4 | 152 |
| Example 13 | | 2.0 | 0 | 520K | 4.7 | 152 |
| Example 14 | | 2.0 | 10 | 371K | 4.7 | 152 |
| Example 15 | | 5.0 | 0 | 644K | 5.6 | 152 |
| Example 16 | | 5.0 | 10 | 494K | 5.6 | 152 |
| Example 17 | | 10.0 | 0 | 732K | 4.9 | 152 |
| Example 18 | | 10.0 | 10 | 643K | 5.7 | 152 |
| Example 19 | | 15.0 | 0 | 781K | 4.4 | 152 |
| Example 20 | | 15.0 | 10 | 695K | 5.0 | 152 |
| Example 21 | Catalyst Preparation Example 3 | 1.0 | 0 | 441K | 4.5 | 152 |
| Example 22 | | 1.0 | 10 | 310K | 4.5 | 152 |
| Example 23 | | 2.0 | 0 | 532K | 4.8 | 152 |
| Example 24 | | 2.0 | 10 | 383K | 4.8 | 152 |
| Example 25 | | 5.0 | 0 | 652K | 5.6 | 152 |
| Example 26 | | 5.0 | 10 | 505K | 5.6 | 152 |
| Example 27 | | 10.0 | 0 | 744K | 4.8 | 152 |
| Example 28 | | 10.0 | 10 | 651K | 5.8 | 152 |
| Example 29 | | 15.0 | 0 | 793K | 4.3 | 152 |
| Example 30 | | 15.0 | 10 | 703K | 5.0 | 152 |
| Comparative Example 1 | Catalyst Preparation Example 1 | — | — | 615K | 2.6 | 152 |
| Comparative Example 2 | Catalyst Preparation Example 1 | 30 | — | No measurement due to crosslinking | | |

TABLE 2

| Division | Melt Index (g/10 min) | ARES Melt Strength (g) | Gel content (wt %) | Branching Index (g') |
|---|---|---|---|---|
| Example 1 | 1.1 | 25 | 0.3 | 0.85 |
| Example 2 | 5.7 | 18 | 0.2 | 0.84 |
| Example 3 | 0.8 | 34 | 0.5 | 0.81 |
| Example 4 | 4.2 | 26 | 0.3 | 0.81 |
| Example 5 | 0.4 | 44 | 0.8 | 0.76 |
| Example 6 | 2.1 | 38 | 0.4 | 0.76 |
| Example 7 | 0.3 | 56 | 1.1 | 0.72 |
| Example 8 | 0.9 | 49 | 0.6 | 0.73 |
| Example 9 | 0.2 | 65 | 1.7 | 0.69 |
| Example 10 | 0.4 | 60 | 0.9 | 0.69 |
| Example 11 | 2.9 | 12 | 2.1 | 0.88 |
| Example 12 | 8 | 9 | 1.2 | 0.88 |
| Example 13 | 2.1 | 17 | 4.4 | 0.85 |
| Example 14 | 5.9 | 14 | 2.2 | 0.85 |
| Example 15 | 0.8 | 22 | 8.9 | 0.80 |
| Example 16 | 3.7 | 21 | 4.3 | 0.80 |
| Example 17 | 0.4 | 16 | 15.9 | 0.84 |
| Example 18 | 0.9 | 25 | 7.5 | 0.79 |
| Example 19 | 0.2 | 8 | 24.5 | 0.88 |
| Example 20 | 0.5 | 20 | 13.9 | 0.83 |
| Example 21 | 2.7 | 14 | 2.3 | 0.87 |
| Example 22 | 7.8 | 11 | 1.3 | 0.87 |
| Example 23 | 1.9 | 19 | 4.7 | 0.84 |
| Example 24 | 5.7 | 16 | 2.5 | 0.84 |
| Example 25 | 0.6 | 26 | 9.4 | 0.80 |
| Example 26 | 3.4 | 23 | 4.7 | 0.80 |
| Example 27 | 0.4 | 15 | 16.1 | 0.84 |
| Example 28 | 0.7 | 27 | 7.9 | 0.78 |
| Example 29 | 0.2 | 9 | 24.9 | 0.89 |
| Example 30 | 0.4 | 19 | 14.4 | 0.83 |
| Comparative Example 1 | 0.5 | 5 | 0 | 1.0 |
| Comparative Example 2 | — | — | 29.9 | — |

TABLE 3

| Division | Supported catalyst | Feeding amount of diene (mL) | Feeding amount of hydrogen (mg) | Molecular weight (Mw) | Molecular weight distribution | Tm (° C.) |
|---|---|---|---|---|---|---|
| Example 31 | Catalyst Preparation Example 4 | 1.0 | 0 | 740K | 4.9 | 152 |
| Example 32 | | 2.0 | 10 | 526K | 5.4 | 152 |
| Example 33 | | 5.0 | 20 | 443K | 6.4 | 152 |
| Example 34 | | 10.0 | 30 | 317K | 7.2 | 152 |
| Example 35 | | 15.0 | 30 | 361K | 8.2 | 152 |
| Example 36 | Catalyst Preparation Example 5 | 1.0 | 0 | 468K | 4.6 | 152 |
| Example 37 | | 2.0 | 10 | 395K | 4.9 | 152 |
| Example 38 | | 5.0 | 20 | 457K | 5.7 | 152 |
| Example 39 | | 10.0 | 30 | 394K | 5.8 | 152 |
| Example 40 | | 15.0 | 30 | 453K | 5.1 | 152 |
| Comparative Example 3 | Catalyst Preparation Example 4 | — | — | 735K | 2.6 | 152 |
| Comparative Example 4 | | — | 10 | 494K | 2.8 | 152 |
| Comparative Example 5 | | 40 | 0 | No measurement due to crosslinking | | |

TABLE 4

| Division | Melt Index (g/10 min) | ARES Melt Strength (g) | Gel content (wt %) | Branching index (g') |
|---|---|---|---|---|
| Example 31 | 0.5 | 27 | 0.3 | 0.85 |
| Example 32 | 2.3 | 33 | 0.3 | 0.81 |
| Example 33 | 3.1 | 40 | 0.1 | 0.76 |
| Example 34 | 7.8 | 48 | 0.5 | 0.72 |
| Example 35 | 5.2 | 55 | 0.4 | 0.68 |
| Example 36 | 2.5 | 15 | 2.5 | 0.86 |
| Example 37 | 3.6 | 18 | 2.9 | 0.84 |
| Example 38 | 2.5 | 23 | 4.5 | 0.79 |
| Example 39 | 3.4 | 24 | 5.5 | 0.78 |
| Example 40 | 2.3 | 14 | 11.6 | 0.83 |
| Comparative Example 3 | 0.5 | 5 | 0 | 1 |
| Comparative Example 4 | 2.4 | 0.4 | 0 | 1 |
| Comparative Example 5 | — | — | 38.2 | — |

Referring to Table 1 and Table 2, when a diene-modified polypropylene resin in a polymerization process is prepared by contacting propylene and a specific content of diene compounds using a specific metallocene catalyst according to the present invention, the diene-modified polypropylene resin has excellent catalyst activity, and exhibits physical properties different from the conventional copolymers (Comparative Examples 1 and 2) by having adequate weight average molecular weight and molecular weight distribution. Therefore, it can be confirmed that processability is improved and the diene-modified polypropylene resin has physical properties suitable for improving an ARES melt strength. In addition, it can be confirmed that a branching index is improved, and an ARES melt strength can be improved to an optimum level while maintaining a gel content less than or equal to 3%.

Meanwhile, it can be confirmed that as an added amount of diene increases according to the structural difference of the metallocene catalysts (Catalyst Preparation Examples 1 to 3), the gel content increases sharply, but there is a limitation for the increase of the ARES melt strength (see Examples 1 to 30).

Specifically, it can be confirmed that when a polypropylene resin is prepared using catalysts in which two of $R_1$, $R_2$, $R_3$, and $R_4$ in the structure of Formula 1 of the present invention are substituted with hydrogen (see Examples 1 to 10), a polypropylene resin having a very low gel content while maintaining the excellent ARES melt strength can be prepared, but when using catalysts in which all of $R_1$, $R_2$, $R_3$, and $R_4$ in the structure of Formula 1 are substituted with an alkyl group (i.e., hydrogen is not substituted) (Examples 11 to 20), the gel content is rapidly increased, and when using catalysts in which one of $R_1$, $R_2$, $R_3$, and $R_4$ in the structure of Formula 1 is substituted with hydrogen (see Examples 21 to 30), the gel content also increases together with the ARES melt strength.

Referring to Table 3 and Table 4, when a diene-modified polypropylene resin in a polymerization process is prepared by contacting propylene and a diene compound using a specific metallocene supported catalyst according to the present invention (see Examples 31 to 40), the diene-modified polypropylene resin has excellent catalytic activity, and shows proper physical properties different from conventional copolymers (see Comparative Examples 3 to 5) by having appropriate weight average molecular weights and molecular weight distributions. Therefore, it can be confirmed that processability is improved and the diene-modified polypropylene resin has physical properties suitable for improving an ARES melt strength. In addition, it can be confirmed that a branching index is improved, and an ARES melt strength can be improved dramatically while maintaining a gel content less than or equal to 0.5%.

Specifically, it can be confirmed that when a polypropylene resin is prepared using catalysts in which two of $R_1$, $R_2$, $R_3$, and $R_4$ in the structure of Formula 6 of the present invention are substituted with hydrogen (see Examples 1 to 35), a polypropylene resin having a very low gel content while maintaining the excellent ARES melt strength can be prepared, but when using catalysts in which one of $R_1$, $R_2$, $R_3$, and $R_4$ in the structure of Formula 6 is substituted with hydrogen (see Examples 36 to 40), the gel content increases together with the ARES melt strength.

When comparing the catalysts prepared according to Catalyst Preparation Examples 2 and 3, in Catalyst Preparation Example 3, one hydrogen instead of a methyl group is substituted to cyclopentadienyl, so that the steric hindrance effect is relatively less. This allows the content of a diene compound such as 1,5-hexadiene in a main chain to be increased by inducing an insertion reaction of diene relatively in the case of Catalyst Preparation Example 3 rather than in the case of Catalyst Preparation Example 2.

The injected diene compound selects one of two reaction pathways, cross-linking and cyclization of a pentagonal structure. The cross-linking is a reaction that acts as a bridge connecting two main chains when while the diene compound is bonded in one main chain and moves to a chain reaction, the remaining double bond can introduce the other main chain to the catalytically active site which is growing. If the reaction occurs continuously, the degree of cross-linking increases, and thus the gel content increases. In the case of cyclization, one double bond of the diene compound is bound to the main chain, and the remaining double bond is directly bound to the catalytically active site to form a stable pentagonal structure. In other words, after the diene compound is bonded to the main chain, structural differences are shown depending on whether the remaining double bond reacts directly to the catalytically active site or moves to the chain reaction to react with the other main chain, and the cross-linking and the cyclization react competitively.

Here, in order for the cyclization to occur, environmentally favorable conditions in which the cyclization occurs are necessary. In order to form a ring shape, it is advantageous to have fewer steric hindrances. In the case of the catalysts prepared according to Catalyst Preparation Examples 2 and 3 mentioned above, compared to the structure of the catalyst according to Catalyst Preparation Example 2, the catalyst according to Catalyst Preparation Example 3 has less steric hindrance effect when one methyl group of cyclopentadienyl is substituted with hydrogen, and thus the insertion reactivity of diene increases, and as a result, the branching effect increases, so that the ARES melt strength increases relatively.

However, since one methyl group of cyclopentadienyl is substituted with hydrogen, there is a steric hindrance to progress to the cyclization of diene. Thus, the injected diene compound induces a bond with another polymer chain, and, as the number of the bond increases, it results in increase of the gel content. Since two methyl groups of cyclopentadienyl are substituted with hydrogen, the catalyst prepared according to Catalyst Preparation Example 1 has a less steric hindrance to progress to the cyclization of diene. Accordingly, the cross-linking and the cyclization are effectively controlled to reduce the gel phenomenon, and the polymer branch structure is stably controlled, thereby exhibiting an effect of increasing the ARES melt strength.

In addition, it was confirmed that the insertion reactivity of diene increased, thereby increasing long chain branching. When comparing the catalysts prepared according to Catalyst Preparation Examples 1 and 4, it was found that $BH_4$ forms a high molecular weight. This allows the amount of diene to be increased as the length of the main chain increases and to exhibit a relatively high ARES melt strength as the side chains are elongated. The reason why the gel phenomenon did not increase is that the cross-linking and the cyclization of diene were properly performed even when the main chain increased. Compared to the catalysts prepared according to Catalyst Preparation Examples 3 and 5, it can be seen that the catalyst according to Catalyst Preparation Example 5 forms a high molecular weight due to the $BH_4$ effect and exhibits a relatively high ARES melt strength due to long side chains, but the gel phenomenon increases. This is because the longer length of the main chain increases the number of dienes incorporated on the polymer chain, thus likelihood of the cross-linking is enhanced. When the gel phenomenon is increased, the density of crosslinking in the gels increases, which causes separation from the polymer chain in which the gel phenomenon does not occur. In particular, this is also a cause that when a product is processed by injection or extrusion, a difference in polymer flow occurs at a high temperature, and physical properties are deteriorated when being used as a product. The appropriate cross-linking prevents the gel phenomenon and provides a long chain branching effect. This can be seen as evidence that the proper reaction ratio in the cross-linking reaction and the cyclization by diene shows the effect of gel control and ARES melt strength.

Hitherto, the preferred examples of the present invention have been described in detail. The description of the present invention is only for illustration, and it could be understood that particular embodiment could be easily changed without changing the technical spirit or essential features of the present invention by one of ordinary skilled in the art.

Accordingly, it should be interpreted that the scope of the present invention is represented by claims hereinafter rather than the detailed description, and all changes or modifications derived from the meaning, range and equivalent concept of claims are included in the scope of the present invention.

The invention claimed is:

1. A method for preparing a diene-modified polypropylene resin having a branching index of 0.95 or less, a gel content of 3 wt % or less and an advanced rheometric expansion system (ARES) melt strength of 5 g or more comprising polymerizing propylene and a diene compound in the presence of a catalyst containing a transition metal compound represented by Formula 1 below:

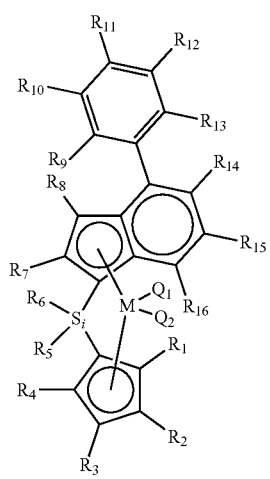

[Formula 1]

wherein, in Formula 1,

M is a Group 4 transition metal;

Q1 and Q2 are each independently halogen, $(C_1$-$C_{20})$alkyl, $(C_2$-$C_{20})$alkenyl, $(C_2$-$C_{20})$alkynyl, $(C_6$-$C_{20})$aryl, $(C_1$-$C_{20})$alkyl $(C_6$-$C_{20})$aryl, $(C_6$-$C_{20})$aryl $(C_1$-$C_{20})$alkyl, $(C_1$-$C_{20})$alkylamido or $(C_6$-$C_{20})$arylamido, or represented by Formula 5 below, and in Formula 5 below, $R_{17}$ and $R_{18}$ are each independently hydrogen, $(C_1$-$C_{20})$alkyl, $(C_2$-$C_{20})$alkenyl, $(C_2$-$C_{20})$alkynyl, $(C_6$-$C_{20})$aryl, $(C_1$-$C_{20})$alkyl $(C_6$-$C_{20})$aryl, $(C_6$-$C_{20})$aryl $(C_1$-$C_{20})$alkyl, $(C_1$-$C_{20})$alkylamido or $(C_6$-$C_{20})$arylamido, and n is an integer of 1 or 2;

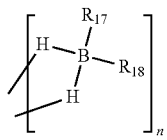

[Formula 5]

$R_1$, $R_2$, $R_3$ and $R_4$ are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl $(C_6-C_{20})$aryl including or not including acetal, ketal or an ether group; $(C_6-C_{20})$aryl $(C_1-C_{20})$alkyl including or not including acetal, ketal or an ether group; or $(C_1-C_{20})$silyl including or not including acetal, ketal or an ether group; and two or more among $R_1$, $R_2$, $R_3$, and $R_4$ may be connected with each other to form an aliphatic ring or an aromatic ring;

$R_5$, $R_6$, $R_7$ and $R_8$ are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl $(C_6-C_{20})$aryl including or not including acetal, ketal or an ether group; and $R_9$, $R_{10}$, $R_{11}$, $R_{12}$, $R_{13}$, $R_{14}$, $R_{15}$, and $R_{16}$ are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl $(C_6-C_{20})$aryl including or not including acetal, ketal or an ether group; $(C_6-C_{20})$aryl $(C_1-C_{20})$alkyl including or not including acetal, ketal or an ether group; or $(C_1-C_{20})$silyl including or not including acetal, ketal or an ether group; and two or more among $R_9$, $R_{10}$, $R_{11}$, $R_{12}$, $R_{13}$, $R_{14}$, $R_{15}$, and $R_{16}$ may be connected with each other to form an aliphatic ring or an aromatic ring;

wherein at least one among $R_1$, $R_2$, $R_3$ and $R_4$ is hydrogen, at least one is $(C_4-C_{20})$alkyl, and the others are each independently $(C_1-C_{20})$alkyl, $(C_2-C_{20})$alkenyl, or $(C_1-C_{20})$silyl including or not including acetal, ketal or an ether group; or at least two among $R_1$, $R_2$, $R_3$ and $R_4$ may be connected with each other to form an aliphatic ring or an aromatic ring.

2. The method of claim 1, wherein at least one among $R_1$, $R_2$, $R_3$ and $R_4$ is hydrogen, at least one is $(C_4-C_{20})$alkyl, and the others are each independently $(C_1-C_{20})$alkyl.

3. The method of claim 1, wherein at least two among $R_1$, $R_2$, $R_3$ and $R_4$ are hydrogen, at least one is $(C_4-C_{20})$alkyl, and the other is $(C_1-C_{20})$alkyl.

4. The method of claim 1, wherein the catalyst is a catalyst in which a transition metal compound of Formula 1; and at least one cocatalyst compound selected from the group consisting of the compounds represented by Formulae 2 to 4 below are supported:

—[Al(R21)-O]$n$-     [Formula 2]

in Formula 2, R21's may be the same as or different from each other, and are each independently a halogen radical, a halogen-substituted or unsubstituted $C_1-C_{20}$ hydrocarbyl radical; and n is an integer of 2 or more;

A(R22)$_3$     [Formula 3]

in Formula 3, A may be aluminum or boron; R22's are the same as or different from each other, and are each independently a halogen radical, or a halogen-substituted orunsubstituted $C_1-C_{20}$ hydrocarbyl radical;

[L$_a$-H]$^+$[Z(B)$_4$]$^-$ or[L$_b$]$^+$[Z(B)$_4$]$^-$     [Formula 4]

in Formula 4, L$_a$ is a neutral Lewis base; L$_b$ is a cationic Lewis acid; H is a hydrogen atom; and Z may be a Group 13 element; and B's are each independently a $C_6-C_{20}$ aryl or alkyl radical having at least one hydrogen atom substituted with a halogen radical, a $C_1-C_{20}$ hydrocarbyl radical, a $C_1-C_{20}$ alkoxy radical, or a $C_1-C_{20}$ phenoxy radical.

5. The method of claim 1, wherein the diene compound is at least one selected from an aliphatic diene compound or an aromatic diene compound having 4 to 20 carbon atoms.

6. The method of claim 5, wherein the diene compound is at least one selected from the group consisting of 1,5-hexadiene, 1,6-heptadiene, 1,7-octadiene, 1,8-nonadiene, 1,9-decadiene, 1,10-undecadiene, 1,11-dodecadiene, 1,12-tridecadiene and 1,13-tetradecadiene.

7. The method of claim 1, wherein a polymerization reaction is performed by adding 0.008-0.25 mole of the diene compound with respect to 500 g of the propylene.

8. The method of claim 1, wherein the diene-modified polypropylene resin is a non-unimodal diene-modified polypropylene resin having a molecular weight distribution of 3.0 or more.

9. The method of claim 1, wherein the diene-modified polypropylene resin has a melting peak of 160° C. or less.

\* \* \* \* \*